United States Patent
Osada

(10) Patent No.: US 9,760,070 B2
(45) Date of Patent: Sep. 12, 2017

(54) VARIABLE SPEED DEVICE AND VARIABLE SPEED SYSTEM

(71) Applicant: Hideki Osada, Tokyo (JP)

(72) Inventor: Hideki Osada, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 241 days.

(21) Appl. No.: 14/425,967

(22) PCT Filed: Nov. 14, 2012

(86) PCT No.: PCT/JP2012/079565
§ 371 (c)(1),
(2) Date: Mar. 4, 2015

(87) PCT Pub. No.: WO2014/076787
PCT Pub. Date: May 22, 2014

(65) Prior Publication Data
US 2015/0220070 A1 Aug. 6, 2015

(51) Int. Cl.
*G05B 15/02* (2006.01)
*H02P 27/08* (2006.01)
(Continued)

(52) U.S. Cl.
CPC .............. *G05B 15/02* (2013.01); *G01P 13/04* (2013.01); *H02P 27/085* (2013.01); *G01D 7/02* (2013.01)

(58) Field of Classification Search
CPC ....................................................... G05B 15/02
(Continued)

(56) References Cited

U.S. PATENT DOCUMENTS 5,105,130 A     4/1992 Barker et al.
5,239,251 A  *  8/1993 Lauw ..................... H02P 6/005
                                                       290/31
(Continued)

FOREIGN PATENT DOCUMENTS

JP      08-126387 A     5/1996
JP      09-023693 A     1/1997
(Continued)

OTHER PUBLICATIONS

Communication dated Mar. 15, 2016 from the Japanese Patent Office issued in corresponding Application No. 2014-546777.
(Continued)

*Primary Examiner* — David S Luo
(74) *Attorney, Agent, or Firm* — Sughrue Mion, PLLC; Richard C. Turner

(57) ABSTRACT

A variable speed device that drives an electric motor includes a first acquiring unit that acquires a first parameter concerning an operation state of the electric motor, a second acquiring unit that acquires a second parameter concerning the operation state of the electric motor, the second parameter being related to the first parameter, a third acquiring unit that acquires a third parameter concerning a setting state of the electric motor, and a display control unit that simultaneously displays, on one display screen, a first display item corresponding to the acquired first parameter, a second display item corresponding to the acquired second parameter, and a third display item corresponding to the acquired third parameter. The display control unit graphically displays the first display item and the second display item in association with each other.

8 Claims, 14 Drawing Sheets

(51) Int. Cl.
*G01P 13/04* (2006.01)
*G01D 7/02* (2006.01)

(58) Field of Classification Search
USPC .................................. 318/3, 34, 558
See application file for complete search history.

(56) References Cited

U.S. PATENT DOCUMENTS

| | | | |
|---|---|---|---|
| 6,445,332 B1* | 9/2002 | Younger | H02P 6/22 318/17 |
| 7,026,784 B2* | 4/2006 | Shimizu | G05B 23/0235 318/400.13 |
| 7,436,140 B2* | 10/2008 | Takaji | F16M 11/08 248/349.1 |
| 2007/0013326 A1 | 1/2007 | Kling et al. | |
| 2009/0174538 A1 | 7/2009 | Shibata et al. | |

FOREIGN PATENT DOCUMENTS

| | | |
|---|---|---|
| JP | 2002-157077 A | 5/2002 |
| JP | 2002-320399 A | 10/2002 |
| JP | 2004-325906 A | 11/2004 |
| JP | 2005-096900 A | 4/2005 |
| JP | 2006-025571 A | 1/2006 |
| JP | 2007-292834 A | 11/2007 |
| JP | 2009-80186 A | 4/2009 |
| KR | 1020000049335 A | 8/2000 |
| KR | 1020080091331 A | 10/2008 |
| TW | 2007-026062 A | 7/2007 |

OTHER PUBLICATIONS

Communication dated May 18, 2016, issued by the Korean Intellectual Property Office in corresponding Korean Application No. 10-2015-7011400.
International Search Report for PCT/JP2012/079565 dated Feb. 19, 2013 [PCT/ISA/210].
Written Opinion for PCT/JP2012/079565 dated Feb. 19, 2013 [PCT/ISA/237].
Taiwanese Office Action for 103-2(4) 04428-10321773690 dated Dec. 22, 2014.
Communication dated Sep. 2, 2016 from the State Intellectual Property Office of the P.R.C. in counterpart application No. 201280076985.5.
Communication dated Sep. 23, 2016 from the European Patent Office in counterpart application No. 12888334.5.
Communication dated Jul. 7, 2015 from the Japanese Patent Office in counterpart application No. 2014-546777.
Communication dated Feb. 22, 2017, issued by the European Patent Office in corresponding European Application No. 12888334.5.
Communication dated Nov. 28, 2016, issued by the Korean Intellectual Property Office in corresponding Korean Application No. 10-2015-7011400.
Hyundai Biotech; "Auto Tumbler Machine," Manuals for electric control box Jun. 2009 (18 pages total).

* cited by examiner

FIG.3
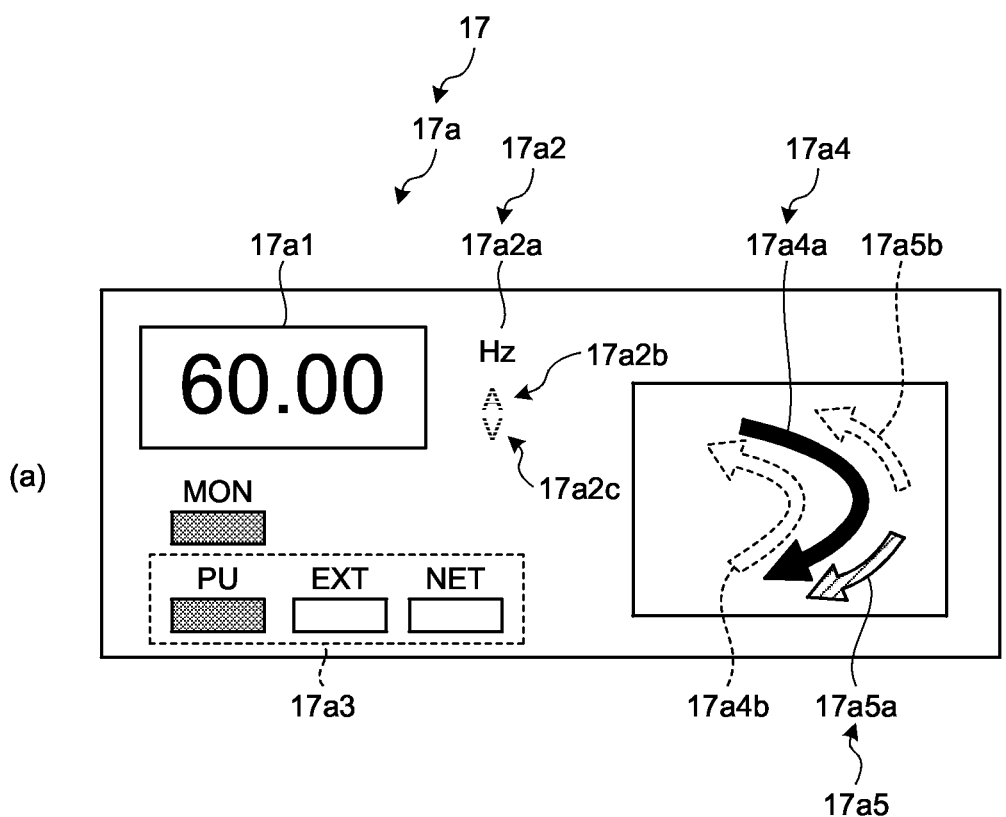
(a)
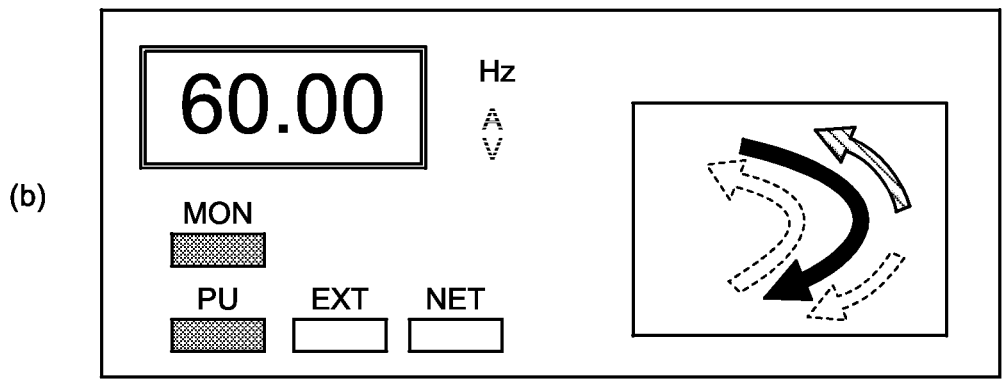
(b)

FIG.4
(a) 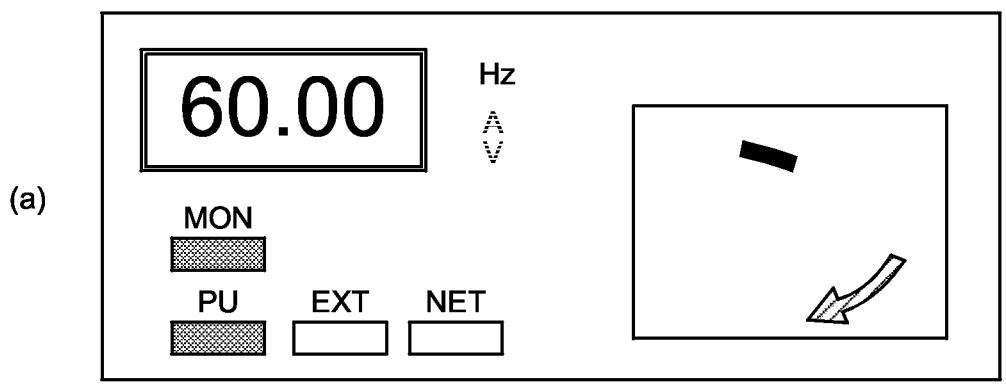
(b) 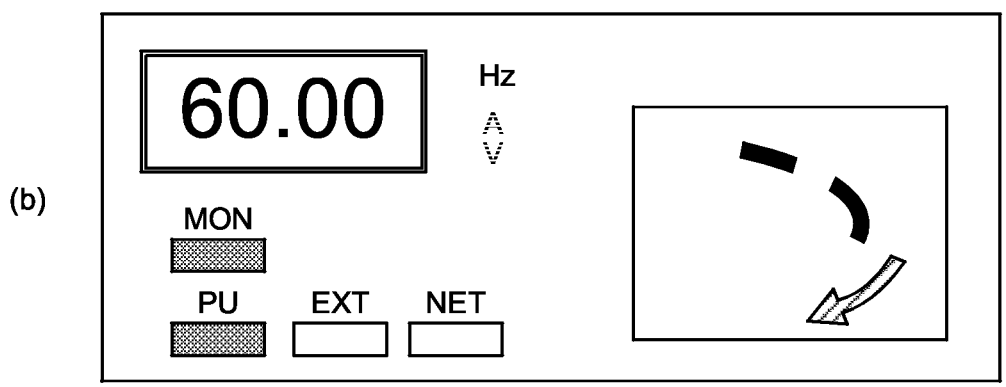
(c) 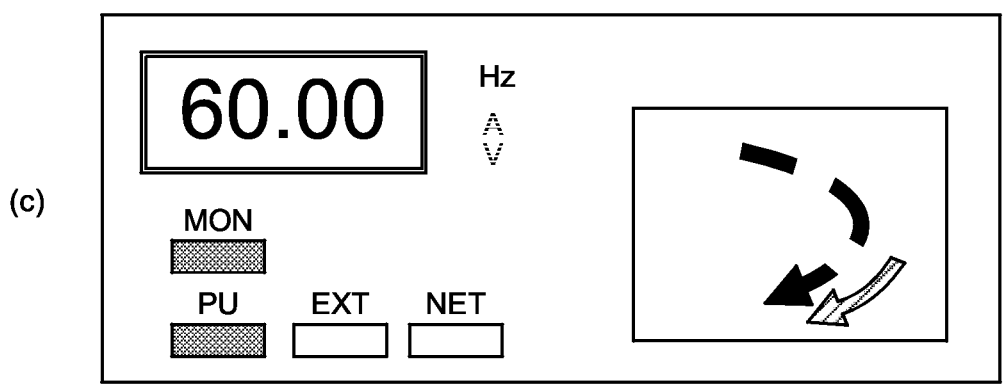

FIG.8
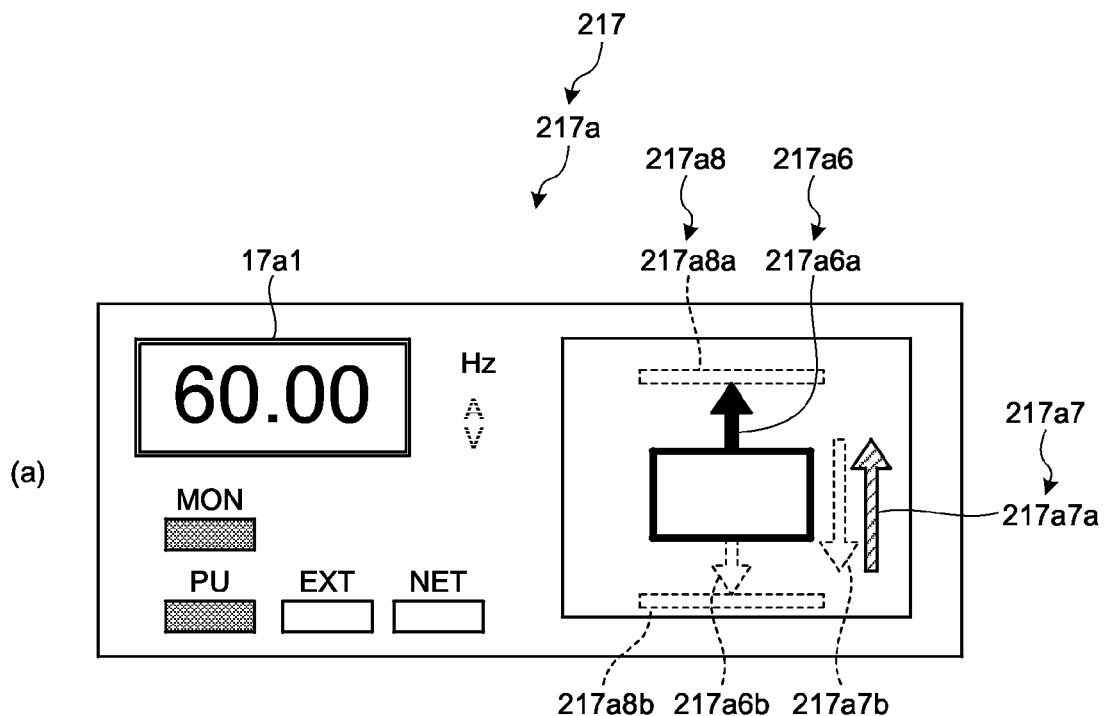
(a)
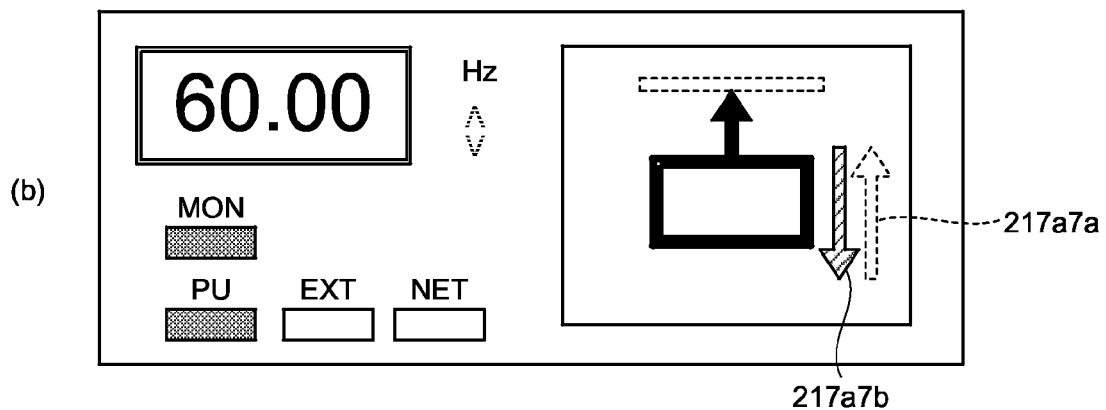
(b)

FIG.9
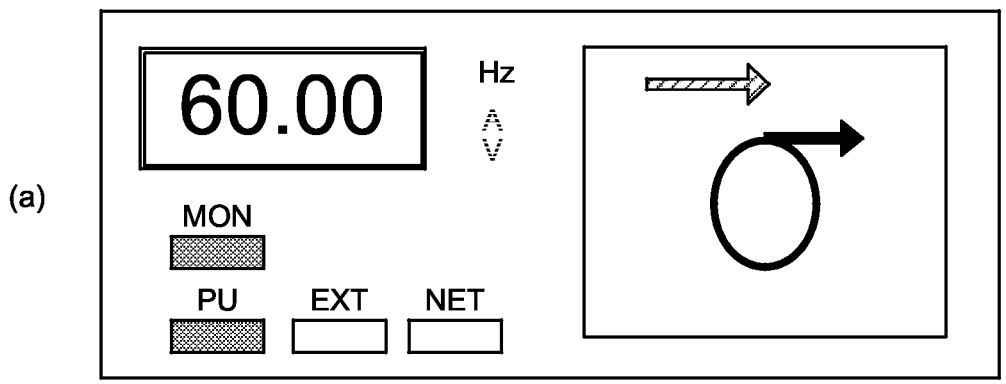
(a)
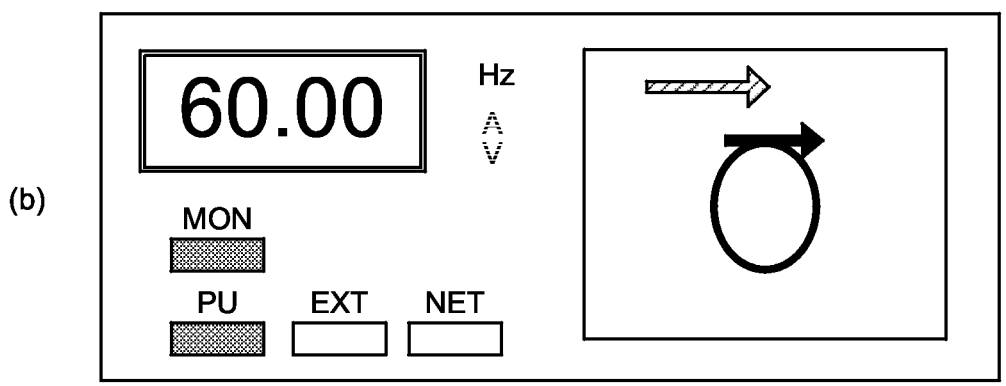
(b)
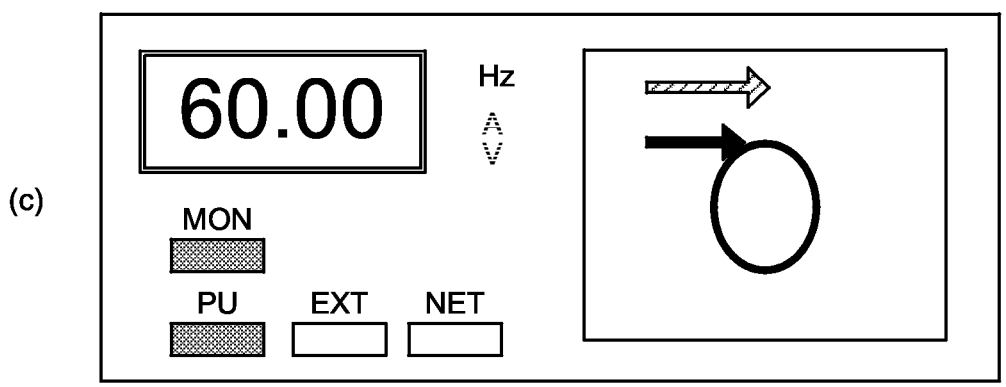
(c)

FIG.14
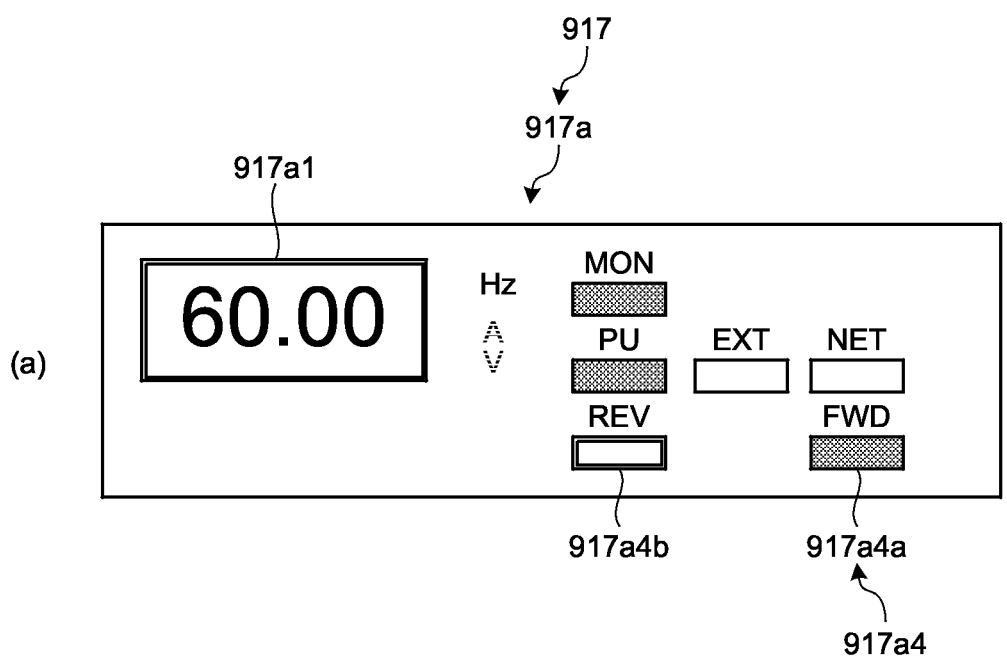
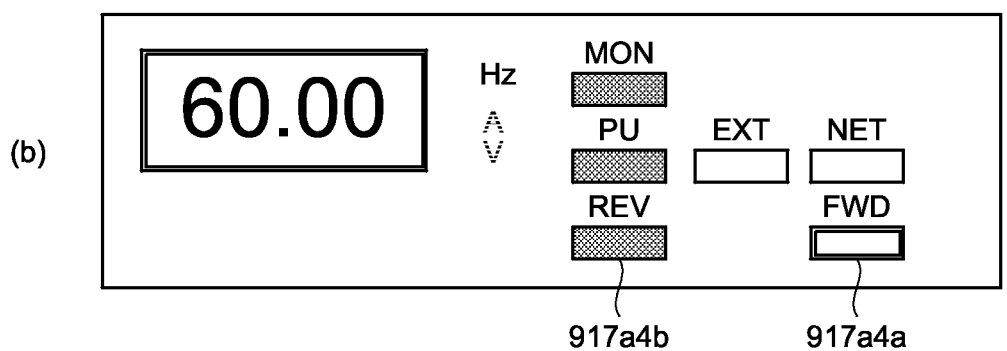

VARIABLE SPEED DEVICE AND VARIABLE SPEED SYSTEM

CROSS REFERENCE TO RELATED APPLICATIONS

This application is a National Stage of International Application No. PCT/JP2012/079565 filed Nov. 14, 2012, the contents of all of which are incorporated herein by reference in their entirety.

FIELD

The present invention relates to a variable speed device and a variable speed system.

BACKGROUND

Patent Literature 1 describes an inverter apparatus in which a signal from an operation key is input to an inverter control device and the inverter control device creates numerical data and causes a numerical-data display unit to display the numerical data, and creates a blinking pattern and causes any one of a plurality of function indicator lamps to blink. Specifically, when a power supply is turned on, in response to an output from the inverter control device, a function indicator lamp for frequency designation setting is lit and the numerical-data display unit displays numerical data for the frequency command setting. When an operation key of an operation-item switching key is operated, the function indicator lamp for the frequency command setting is extinguished and a function indicator lamp for output frequency monitoring is lit. The numerical-data display unit displays numerical data for the output frequency monitoring instead of the numerical data for the frequency command setting. When an operation key of an operation command key is operated, an alternating-current electric motor rotates. The inverter control device causes the function indicator lamps to sequentially blink and displays a rotating direction to coincide with a rotating direction of the alternating-current electric motor. Consequently, according to Patent Literature 1, the inverter control device lights a function indicator lamp for an operation item, causes the numerical-data display unit to display a numerical value of the operation item and changes and sets the numerical value, causes function indicator lamps for a plurality of operation items to sequentially blink and displays a rotating direction. Therefore, operability of the inverter apparatus is improved and rotation display is clearly shown.

CITATION LIST

Patent Literature

Patent Literature 1: Japanese Patent Application Laid-Open No. H8-126387

SUMMARY

Technical Problem

In the technology of Patent Literature 1, before the operation of the electric motor is started, numerical data corresponding to any one lit function indicator lamp among the function indicator lamps for a plurality of operation items is displayed on the numerical-data display unit. Therefore, the item that can be displayed by the function indicator lamps for the operation items and the numerical-data display unit is always only one item. In the technology of Patent Literature 1, after the operation of the electric motor is started, the inverter control device causes the function indicator lamps for the operation items to sequentially blink and displays the rotating direction. Therefore, the numerical-data display unit no longer functions. The item that can be displayed by the function indicator lamps for the operation items and the numerical-data display unit is only one item, i.e., the rotating direction of the electric motor. Consequently, after the operation of the electric motor is started, it is difficult to multilaterally check, about a plurality of items, operation states of the electric motor. Further, after the operation of the electric motor is started, it is difficult to check a setting state of the electric motor. Therefore, it is difficult to simultaneously check the operation state of the electric motor and the setting state of the electric motor.

The present invention has been devised in view of the above and it is an object of the present invention to obtain a variable speed device and a variable speed system that can simultaneously check the operation state and the setting state of an electric motor and can multilaterally and visually/intuitively and easily check the operation state of the electric motor.

Solution to Problem

In order to solve the aforementioned problems, a variable speed device that drives an electric motor according to one aspect of the present invention is so constructed as to include: a first acquiring unit that acquires a first parameter concerning an operation state of the electric motor; a second acquiring unit that acquires a second parameter concerning the operation state of the electric motor, the second parameter being related to the first parameter; a third acquiring unit that acquires a third parameter concerning a setting state of the electric motor; and a display control unit that simultaneously displays, on one display screen, a first display item corresponding to the acquired first parameter, a second display item corresponding to the acquired second parameter, and a third display item corresponding to the acquired third parameter, wherein the display control unit graphically displays the first display item and the second display item in association with each other.

Advantageous Effects of Invention

According to the present invention, the display control unit simultaneously displays, on one display screen, a first display item corresponding to the first parameter concerning the operation state of the electric motor, a second display item corresponding to the second parameter concerning the operation state of the electric motor, and a third display item corresponding to the third parameter concerning the setting state of the electric motor. Consequently, it is possible to simultaneously check the operation state of an electric motor M and the setting state of the electric motor. The display control unit graphically displays the first display item and the second display item in association with each other. Consequently, it is easy to, for example, compare, about a plurality of items, operation states of the electric motor. It is made possible to multilaterally check, about a plurality of items, operation states of the electric motor. That is, it is possible to simultaneously check the operation state of the electric motor and the setting state of the electric motor and multilaterally and visually/intuitively and easily check the operation state of the electric motor.

BRIEF DESCRIPTION OF DRAWINGS

FIG. 3 is a diagram of the operation of a display screen in the first embodiment.

FIG. 4 is a diagram of the operation of a display screen in a modification of the first embodiment.

FIG. 8 is a diagram of the configuration of a display screen in the second embodiment.

FIG. 9 is a diagram of the operation of a display screen in a modification of the second embodiment.

FIG. 14 is a diagram of the operation of a display screen in another comparative example.

DESCRIPTION OF EMBODIMENTS

Embodiments of a variable speed system according to the present invention are explained in detail below with reference to the drawings. Note that the present invention is not limited by the embodiments.

First Embodiment.

Figure 1:
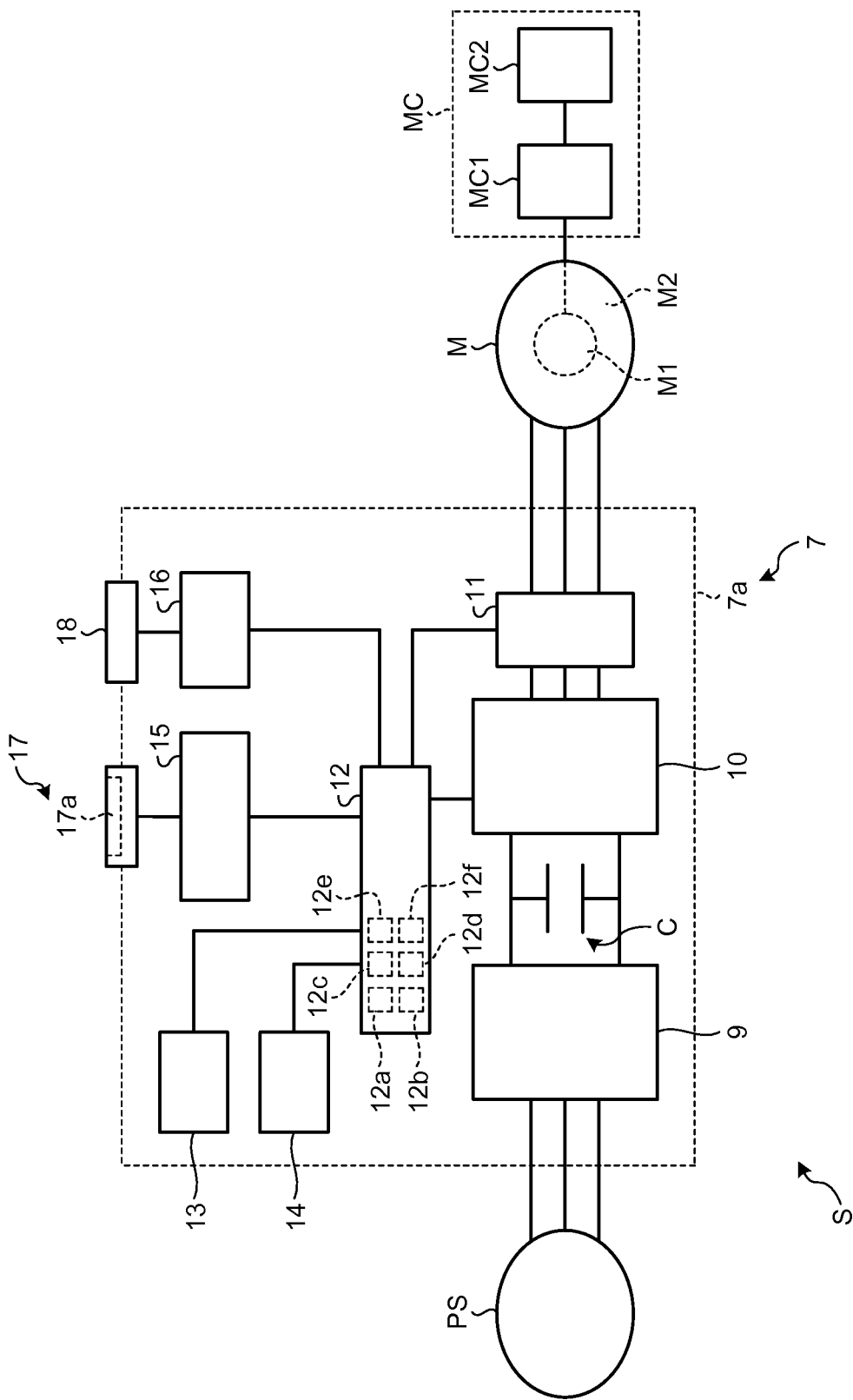
FIG. 1 is a diagram of the configuration of a variable speed system according to a first embodiment.

A variable speed system S according to a first embodiment is explained with reference to FIG. 1. FIG. 1 is a diagram of the configuration of the variable speed system S.

The variable speed system S receives, for example, alternating-current power from a power supply PS and causes a mechanical apparatus MC to operate using the alternating-current power. Specifically, the variable speed system S includes a variable speed device 7, an electric motor M, and the mechanical apparatus MC.

The variable speed device 7 changes the speed of the electric motor M. The variable speed device 7 is, for example, an inverter device or a servo amplifier. In the following illustrative explanation, the variable speed device 7 is an inverter device. However, the idea of this embodiment can also be applied when the variable speed device 7 is a servo amplifier.

The variable speed device 7 receives, for example, alternating-current power from the power supply PS, converts the alternating-current power into predetermined direct-current power, and further converts the converted direct-current power into alternating-current power. The variable speed device 7 supplies the converted alternating-current power to the electric motor M to drive the electric motor M.

The electric motor M is driven by the variable speed device 7 to cause the mechanical apparatus MC to operate. For example, the electric motor M is a motor and includes a rotor M1 and a stator M2. Alternatively, for example, the electric motor M is a linear motor and includes a mover and a stator. That is, when the rotor M1 (or the mover) is driven by the variable speed device 7, the electric motor M transmits the motion of the rotor M1 (or the mover) to the mechanical apparatus MC to cause the mechanical apparatus MC to operate.

The mechanical apparatus MC is caused to operate by the electric motor M. For example, the mechanical apparatus MC is an elevator and includes a power transmitting unit MC1 and a driven unit MC2. The power transmitting unit MC1 is, for example, a shaft coupled to the rotor M1 of the electric motor M and a gear provided in the shaft. The power transmitting unit transmits the rotary motion of the rotor M1 to the gear, converts the rotary motion into an elevating motion with the gear and the like, and transmits the converted elevating motion to the driven unit MC2. The driven unit MC2 is, for example, an elevating mechanism and a car. The elevating mechanism lifts and lowers the car to perform, for example, transportation of a predetermined object placed on the car according to the transmitted elevating motion.

The variable speed device 7 is explained. The variable speed device 7 includes a converter unit 9, an inverter unit 10, a current detecting unit 11, an operation unit 18, an operation control unit 16, an inverter control unit 12, a read-only storage device 13, a random-access storage device 14, a display control unit 15, and a display unit 17.

The converter unit 9 receives, for example, alternating-current power from the power supply PS and converts the alternating-current power into predetermined direct-current power. The converter unit 9 includes, for example, a bridge-connected plurality of diodes (not shown in the figure) and a smoothing capacitor C. The converter unit 9 rectifies the alternating-current power and converts the alternating-current power into direct-current power using the diodes. The converter unit 9 smoothes the converted direct-current power with the smoothing capacitor C and supplies the smoothed direct-current power to the inverter unit 10.

The inverter unit 10 receives the direct-current power from the converter unit 9 and converts the direct-current power into alternating-current power under the control by the inverter control unit 12. The inverter unit 10 includes, for example, a plurality of switching elements (not shown in the figure). The inverter unit 10 turns on and off the switching elements respectively at predetermined timings to convert the direct-current power into alternating-current power under the control by the inverter control unit 12. The inverter unit 10 supplies the converted alternating-current power to the electric motor M to drive the electric motor M.

The current detecting unit 11 detects an electric current corresponding to the alternating-current power supplied from the inverter unit 10 to the electric motor M. The current detecting unit 11 includes, for example, a plurality of current transformers (not shown in the figure) and detects phase currents in respective phases using the current transformers. The current detecting unit 11 supplies a detection result to the inverter control unit 12.

The operation unit 18 receives an instruction from an operator. The operation unit 18 includes a plurality of operation members and receives the instruction from the operator via the operation members. The operation members include, for example, dials for changing frequencies and values for setting of operation functions and operation keys for giving operation mode switching/reset/rotation commands. For example, when load torque is displayed, a numerical value of a code number for function setting can be displayed by the operation keys and the dials of the operation unit while an inverter is stopped, so as to set or change the numerical value to a numerical value of a function that can display the load torque.

The operation control unit 16 detects the instruction received by the operation unit 18. The operation control unit 16 detects the instruction received by the operation unit 18 by detecting, for example, how the operation members are operated. The operation control unit 16 supplies the detected instruction to the inverter control unit 12.

The inverter control unit 12 receives the detected instruction from the operation control unit 16 and receives, from the current detecting unit 11, a detection result of an electric current corresponding to the alternating-current power supplied from the inverter unit 10 to the electric motor M. The inverter control unit 12 performs a predetermined control operation according to the detected instruction and the detection result of the electric current. For example, before the driving of the electric motor M is started, the inverter control unit 12 sets parameters for performing the driving of the electric motor M. For example, after the driving of the electric motor M is started, the inverter control unit 12 calculates an operation state of the electric motor M according to the detection result of the electric current and controls the inverter unit 10 according to the calculated operation state of the electric motor M such that the operation state of the electric motor M approaches a predetermined target state.

In the read-only storage device 13, for example, before the shipment of the variable speed device 7, a third parameter concerning a setting state of the electric motor M is set and written in advance. For example, in the read-only storage device 13, numerical data of a plurality of operation items corresponding to a standard operation mode is set and written in advance as the third parameter. The operation items include, for example, a frequency, an electric current, a voltage, and torque. In the read-only storage device 13, the third parameter is stored as, for example, read-only data that cannot be rewritten.

The random-access storage device 14 is used by, for example, the inverter control unit 12 as a work memory for performing a control operation. For example, predetermined parameters calculated by the inverter control unit 12 are written and temporarily stored in the random-access storage device 14. The parameters temporarily stored in the random-access storage device 14 are erased by the inverter control unit 12 at the timing when the parameters are determined to be unnecessary.

The display control unit 15 generates, under the control by the inverter control unit 12, display information that the display control unit 15 should cause the display unit 17 to display and supplies the generated display information to the display unit 17.

The display unit 17 receives the display information from the display control unit 15. The display unit 17 is provided, for example, on a housing 7a of the variable speed device 7 and includes one display screen 17a in a position visually recognizable from the operator. The display unit 17 displays, according to the display information, a predetermined plurality of display items on one display screen 17a.

The configuration of the inverter control unit 12 is explained. The inverter control unit 12 includes a first calculating unit 12a, a first acquiring unit 12b, a second calculating unit 12c, a second acquiring unit 12d, a third calculating unit 12e, and a third acquiring unit 12f.

The third calculating unit 12e calculates the third parameter concerning the setting state of the electric motor M. For example, before the driving of the electric motor M is started, the third calculating unit 12e receives, from the operation control unit 16, a signal indicating an instruction received by the operation unit 18. The third calculating unit 12e calculates, according to the instruction, an operation mode that should be used for the operation of the electric motor M and calculates numerical values of a plurality of operation items corresponding to the operation mode. The third calculating unit 12e writes, for example, calculated numerical value data of the operation items in the random-access storage device 14 as the third parameter.

The first calculating unit 12a calculates a first parameter concerning the operation state of the electric motor M. For example, after the driving of the electric motor M is started, the first calculating unit 12a receives a detection result of an electric current from the current detecting unit 11. The first calculating unit 12a applies a predetermined calculation to the detection result of the electric current and calculates a rotating direction of the electric motor M. The rotating direction of the electric motor M includes, for example, a forward rotating direction and a backward rotating direction. For example, physical positions of winding wires in respective phases in the electric motor M are set in advance in the first calculating unit 12a. The first calculating unit 12a compares temporal changes of phase currents in the phases according to the physical positions of the winding wires in the phases to thereby estimate the rotating direction of the electric motor M. The first calculating unit 12a writes the calculated rotating direction of the electric motor M in the random-access storage device 14 as the first parameter.

The second calculating unit 12c calculates a second parameter concerning the operation state of the electric motor M. The first parameter and the second parameter are parameters related to each other. For example, after the driving of the electric motor M is started, the second calculating unit 12c receives a detection result of an electric current from the current detecting unit 11. The second calculating unit 12c applies a predetermined calculation to the detection result of the electric current and calculates a load state of the electric motor M. The load state of the electric motor M includes, for example, a power running state and a regeneration state. The second calculating unit 12c calculates, for example, using a publicly-known vector control technology as a method of controlling an electric motor, parameters indicating the magnitude of a torque current and power running/regeneration states according to detected coordinate transformations for three phases (three phase to two shape transformation and two-phase fixed coordinate to two-phase rotational coordinate transformation) so as to estimate the load state of the electric motor. The second calculating unit 12c writes the calculated load state of the electric motor M in the random-access storage device 14 as the second parameter.

The first acquiring unit 12b acquires the first parameter. For example, after the driving of the electric motor M is started, the first acquiring unit 12b accesses the random-access storage device 14 and acquires the first parameter temporarily stored in the random-access storage device 14. The first acquiring unit 12b supplies the acquired first parameter to the display control unit 15.

The second acquiring unit 12d acquires the second parameter. For example, after the driving of the electric motor M is started, the second acquiring unit 12d accesses the random-access storage device 14 and acquires the second parameter temporarily stored in the random-access storage device 14. The second acquiring unit 12*d* supplies the acquired second parameter to the display control unit 15.

The third acquiring unit 12*f* acquires the third parameter. For example, after the driving of the electric motor M is started, the third acquiring unit 12*f* determines in which operation mode the electric motor M is operated. For example, when the electric motor M is operated in a standard operation mode, the third acquiring unit 12*f* accesses the read-only storage device 13 and acquires numerical data of a plurality of operation items corresponding to the started operation mode as the third parameter. For example, When the electric motor M is operated in an operation mode designated by the operation unit 18, the third acquiring unit 12*f* acquires the third parameter temporarily stored in the random-access storage device 14. The third acquiring unit 12*f* supplies the acquired third parameter to the display control unit 15.

The configuration of the display control unit 15 is explained in detail. The display control unit 15 simultaneously displays, on one display screen 17*a* in the display unit 17, a first display item corresponding to the first parameter, a second display item corresponding to the second parameter, and a third display item corresponding to the third parameter (see FIGS. 3(*a*) and 3(*b*)). The display control unit 15 graphically displays the first display item and the second display item in association with each other. For example, the display control unit 15 simultaneously displays, on the one display screen 17*a* in the display unit 17, an arrow indicating a rotating direction of the rotor M1 of the electric motor M (a first arrow) and an arrow indicating a load state of the electric motor (a second arrow) (see FIGS. 3(*a*) and 3(*b*)).

Figure 2:
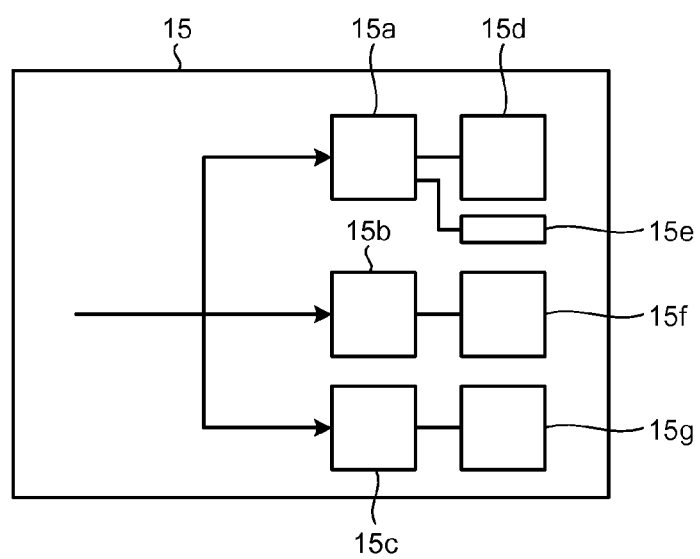
FIG. 2 is a diagram of the configuration of a display control unit in the first embodiment.

Specifically, the display control unit 15 includes, as shown in FIG. 2, a third display-item creating unit 15*a*, a first display-item creating unit 15*b*, a second display-item creating unit 15*c*, a numerical-value display unit 15*d*, a unit display unit 15*e*, a first figure display unit 15*f*, and a second figure display unit 15*g*. FIG. 2 is a diagram of the configuration of the display control unit 15.

The third display-item creating unit 15*a* receives the third parameter from the third acquiring unit 12*f*. The third display-item creating unit 15*a* creates display data of the third display item corresponding to the third parameter. For example, the third display-item creating unit 15*a* creates display data of a plurality of the third display items corresponding to numerical data of a plurality of operation items. The operation items include, for example, a frequency, an electric current, a voltage and torque. Each of the third display items includes a set of a numerical value and a unit.

The third display-item creating unit 15*a* receives, through the operation unit 18, the operation control unit 16, and the inverter control unit 12, a display instruction about an operation item that should be displayed among the operation items, supplies a portion of the numerical value in the display data of the third display item instructed by the display instruction, and supplies a portion of the unit to the unit display unit 15*e*.

The first display-item creating unit 15*b* receives the first parameter from the first acquiring unit 12*b*. The first display-item creating unit 15*b* creates display data of the first display item corresponding to the first parameter. For example, the first display-item creating unit 15*b* creates display data of the first display item corresponding to the rotating direction of the electric motor M. The first display-item creating unit 15*b* supplies the created display data of the first display item to the first figure display unit 15*f*.

The second display-item creating unit 15*c* receives the second parameter from the second acquiring unit 12*d*. The second display-item creating unit 15*c* creates display data of the second display item corresponding to the second parameter. For example, the second display-item creating unit 15*c* creates display data of the second display item corresponding to the load state of the electric motor M. The second display-item creating unit 15*c* supplies the created display data of the second display item to the second figure display unit 15*g*.

The numerical-value display unit 15*d* receives a portion of the numerical value of the display data of the third display item from the third display-item creating unit 15*a*. The numerical-value display unit 15*d* generates, according to the display data of the portion of the numerical value, display information for displaying the portion of the numerical value. For example, when a portion where the numerical value should be displayed in the display unit 17 is a seven-segment display section 17*a*1 (see FIG. 3(*a*)), the numerical-value display unit 15*d* generates display information of the seven-segment display section 17*a*1 corresponding to the numerical value that should be displayed. The numerical-value display unit 15*d* supplies the display information to the seven-segment display section 17*a*1 to thereby cause the seven-segment display section 17*a*1 to display the numerical value corresponding to the display information on the display screen 17*a*. For example, in the case shown in FIG. 3(*a*), a numerical value of a frequency command is displayed in the seven-segment display section 17*a*1 on the display screen 17*a*.

The unit display unit 15*e* shown in FIG. 2 receives a portion of the unit among the display data of the third display item from the third display-item creating unit 15*a*. The unit display unit 15*e* generates, according to the display data of the portion of the unit, display information for displaying the portion of the unit. For example, when a portion where the unit should be displayed in the display unit 17 is a unit display section 17*a*2 (see FIG. 3(*a*)) that lights any one of a plurality of unit indicator lamps 17*a*2*a* to 17*a*2*c*, the unit display unit 15*e* generates display information of the unit display section 17*a*2 corresponding to the unit that should be displayed. The unit display unit 15*e* supplies the display information to the unit display section 17*a*2 to thereby cause the unit display section 17*a*2 to display the unit corresponding to the display information on the display screen 17*a*. For example, in the case shown in FIG. 3(*a*), "Hz", which is a unit of a frequency command, is displayed in the unit display section 17*a*2 on the display screen 17*a*.

The first figure display unit 15*f* shown in FIG. 2 receives the display data of the first display item from the first display-item creating unit 15*b*. The first figure display unit 15*f* generates, according to the display data of the first display item, display information for displaying the first display item. For example, when a portion where the first display item should be displayed in the display unit 17 is a rotating-direction display section 17*a*4 (see FIG. 3(*a*)) that lights any one of a forward rotating direction arrow indicator lamp 17*a*4*a* and a backward rotating direction arrow indicator lamp 17*a*4*b*, the first figure display unit 15*f* generates display information of the rotating-direction display section 17*a*4 corresponding to a rotating direction (forward rotation or backward rotation) that should be displayed. The first figure display unit 15*f* supplies the display information to the rotating-direction display section 17*a*4 to thereby display the rotating direction corresponding to the display information on the display screen 17*a*. For example, in the case shown in FIG. 3(*a*), it is indicated in the rotating-direction display section 17a4 on the display screen 17a that the rotating direction of the electric motor M is the forward rotating direction.

The second figure display unit 15g shown in FIG. 2 receives the display data of the second display item from the second display-item creating unit 15c. The second figure display unit 15g generates, according to the display data of the second display item, display information for displaying the second display item. For example, when a portion where the second display item should be displayed in the display unit 17 is a load-state display section 17a5 (see FIG. 3(a)) that lights any one of a load direction arrow indicator lamp 17a5a and a load direction arrow indicator lamp 17a5b, the second figure display unit 15g generates display information of the load-state display section 17a5 corresponding to a load state (power running or regeneration) that should be displayed. The second figure display unit 15g supplies the display information to the load-state display section 17a5 to thereby cause the load-state display section 17a5 to display the load state corresponding to the display information on the display screen 17a. For example, in the case shown in FIG. 3(b), it is indicated in the load-state display section 17a5 on the display screen 17a that the rotating direction of the electric motor M and the load direction of the electric motor M are opposite directions, that is, the load state of the electric motor M is the power running state. For example, in the case shown in FIG. 3(a), it is indicated in the load-state display section 17a5 on the display screen 17a that the rotating direction of the electric motor M and the load direction of the electric motor M are the same direction, that is, the load state of the electric motor M is the regeneration state.

In this case, the arrow (the first arrow) displayed by the first figure display unit 15f and the arrow (the second arrow) displayed by the second figure display unit 15g are controlled so as to be changed in at least one of thickness of the arrows, color of the arrows, lighting method for the arrows, and length of the arrows. For example, in the case shown in FIGS. 3(a) and 3(b), an arrow of the rotating-direction display section 17a4 and an arrow of the load-state display section 17a5 are displayed in different colors and displayed at different lengths. In FIGS. 3(a) and 3(b), the arrow of the rotating-direction display section 17a4 is indicated by blackening and the arrow of the load-state display section 17a5 is indicated by hatching to indicate that both the arrows have colors different from each other.

Note that the display control unit 15 further creates display data of an operation mode indicator lamp 17a3 (see FIG. 3(a)). The display control unit 15 generates, according to the display data, for example, display information for lighting the operation mode indicator lamp 17a3 corresponding to the present operation mode (e.g., any one of PU: operation panel, EXT: outside, and NET: network).

Next, the operation of the display screen 17a of the display unit 17 is explained.

When the operator operates a rotation command (forward rotation/backward rotation) key in the operation unit 18, the electric motor M rotates according to a set operation condition. The seven-segment display section 17a1 shown in FIG. 3(a) displays a value of a frequency command for the present operation. The unit display section 17a2 lights the unit indicator lamp 17a2a of Hz. When an operation command is given by the operation unit 18, a lamp of PU (operation unit operation) is lit in the operation mode indicator lamp 17a3.

During the operation of the electric motor M, the current detecting unit 11 detects a phase current and supplies a detection result of the electric current to the inverter control unit 12. The inverter control unit 12 performs calculation for discriminating whether the electric motor M is performing power running operation or regeneration operation. A load state (power running load or regenerative load) obtained as a result of the calculation and a present rotating direction in which the inverter is operating are respectively displayed in the load-state display section 17a5 and the rotating-direction display section 17a4.

For example, when the inverter control unit 12 determines that the rotating direction of the electric motor M is the forward rotating direction, as shown in FIGS. 3(a) and 3(b), the forward rotating direction arrow indicator lamp 17a4a in the rotating-direction display section 17a4 is lit.

In this case, for example, when the inverter control unit 12 determines that the load state of the electric motor M is the regenerative load, as shown in FIG. 3(a), the load direction arrow indicator lamp 17a5a in the load-state display section 17a5 is lit. Consequently, the operator can visually recognize that the rotating direction of the electric motor M and the load direction of the electric motor M are the same direction, that is, the load state of the electric motor M is the regeneration state.

Alternatively, in this case, for example, when the inverter control unit 12 determines that the load state of the electric motor M is the power running load, as shown in FIG. 3(b), the load direction arrow indicator lamp 17a5b in the load-state display section 17a5 is lit.

Consequently, the operator can visually recognize that the rotating direction of the electric motor M and the load direction of the electric motor M are opposite directions, that is, the load state of the electric motor M is the power running state.

Further, for example, when the inverter control unit 12 determines that the rotating direction of the electric motor M is the backward rotating direction, although not shown in the figure, the backward rotating direction arrow indicator lamp 17a4b in the rotating-direction display section 17a4 is lit.

In this case, for example, when the inverter control unit 12 determines that the load state of the electric motor M is the power running load, as shown in FIG. 3(a), the load direction arrow indicator lamp 17a5a in the load-state display section 17a5 is lit. Consequently, the operator can visually recognize that the rotating direction of the electric motor M (a direction indicated by the rotating-direction display section 17a4) and the load direction of the electric motor M are opposite directions, that is, the load state of the electric motor M is the power running state.

Alternatively, in this case, for example, when the inverter control unit 12 determines that the load state of the electric motor M is the regenerative load, as shown in FIG. 3(b), the load direction arrow indicator lamp 17a5b in the load-state display section 17a5 is lit. Consequently, the operator can visually recognize that the rotating direction of the electric motor M (the direction indicated by the rotating-direction display section 17a4) and the load direction of the electric motor M are the same direction, that is, the load state of the electric motor M is the regeneration state.

Figure 13:
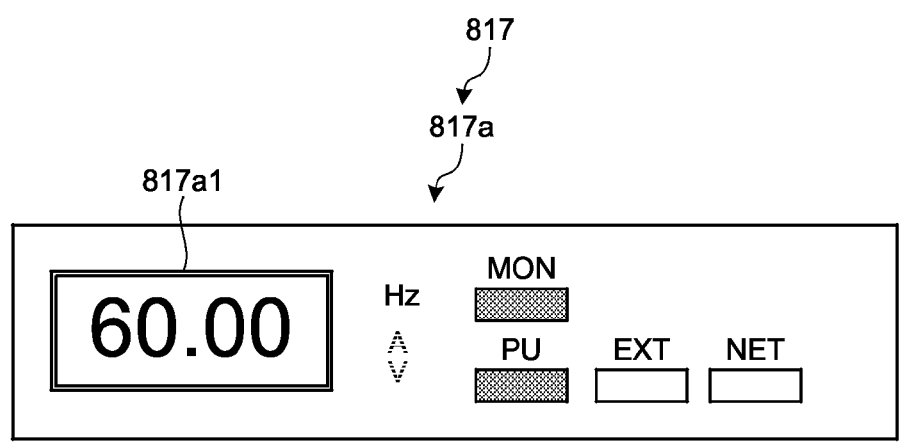
FIG. 13 is a diagram of the operation of a display screen in a comparative example.

It is assumed that, as shown in FIG. 13, the rotating-direction display section 17a4 and the load-state display section 17a5 (see FIG. 3(a)) are not provided in a display unit 817. In this case, to display the rotation state of the electric motor M as the operation state of the electric motor M, for example, the display control unit 15 displays a numerical value or characters indicating the rotation state in a seven-segment display section 817a to display the rotation state of the electric motor M. In such display of the number or the characters, it is likely that a display item and display content are hard to understand unless the display item and the display content are checked in a user's manual. Further, it is likely that the display item is hard to understand unless a reference value of the display item is understood. That is, it is difficult to visually/intuitively check the operation state of the electric motor M.

On the other hand, in the first embodiment, the display control unit 15 graphically displays the first display item corresponding to the first parameter concerning the operation state of the electric motor M and the second display item corresponding to the second parameter concerning the operation state of the electric motor M. Consequently, it is made possible to visually/intuitively and easily check the operation state of the electric motor M.

Alternatively, in the case shown in FIG. 13, to display the rotation state of the electric motor M as the operation state of the electric motor M, for example, the display control unit 15 sequentially lights six segments on the outer side among seven segments in a seven-segment display section 817*a*1 to thereby display the rotation state of the electric motor M. Consequently, it is difficult to cause the seven-segment display section 817*a*1 to display the setting state of the electric motor M. Therefore, it is difficult to simultaneously display the operation state of the electric motor M and the setting state of the electric motor M.

On the other hand, in the first embodiment, the display control unit 15 simultaneously displays, on the one display screen 17*a* in the display unit 17, the first display item corresponding to the first parameter concerning the operation state of the electric motor M, the second display item corresponding to the second parameter concerning the operation state of the electric motor M, and the third display item corresponding to the third parameter concerning the setting state of the electric motor M (see FIGS. 3(*a*) and 3(*b*)). Consequently, it is made possible to simultaneously check the operation state of the electric motor M and the setting state of the electric motor M. Therefore, for example, it is easy to check whether the electric motor M is properly operated according to the setting state.

Alternatively, it is assumed that, as shown in FIGS. 14(*a*) and 14(*b*), a rotating-direction display section 917*a*4 is provided instead of the rotating-direction display section 17*a*4 (see FIG. 3(*a*)) and the load-state display section 17*a*5 (see FIG. 3(*a*)) is not provided in a display unit 917. In this case, the rotating-direction display section 917*a*4 lights any one of a forward rotating direction indicator lamp 917*a*4*a* and a backward rotating direction indicator lamp 917*a*4*b*. That is, the display control unit 15 can cause the rotating-direction display section 917*a*4 to display the rotation state of the electric motor M while causing a seven-segment display section 917*a*1 to display the setting state of the electric motor M. Therefore, it is made possible to simultaneously check the operation state of the electric motor M and the setting state of the electric motor M. However, as it is seen when lighting of the forward rotating direction indicator lamp 917*a*4*a* (FIG. 14(*a*)) and lighting of the backward rotating direction indicator lamp 917*a*4*b* (FIG. 14(*b*)) are compared, it is difficult to visually/intuitively grasp which directions the forward rotating direction and the backward rotating direction actually are.

On the other hand, in the first embodiment, the display control unit 15 graphically displays the first display item corresponding to the first parameter concerning the operation state of the electric motor M and the second display item corresponding to the second parameter concerning the operation state of the electric motor M. Consequently, it is made possible to visually/intuitively grasp which directions the forward rotating direction and the backward rotating direction actually are. It is made possible to visually/intuitively and easily check the operation state of the electric motor M.

Further, in the case shown in FIGS. 14(*a*) and 14(*b*), descriptions corresponding to national languages are necessary for the forward rotating direction indicator lamp 917*a*4*a* and the backward rotating direction indicator lamp 917*a*4*b* to indicate "forward rotation" and "backward rotation". It is necessary to describe display names corresponding to the languages for each of countries. For example, in the case shown in FIGS. 14(*a*) and 14(*b*), assuming the use in the English-speaking countries, "forward rotation" and "backward rotation" are described as "FWD" and "REV". Consequently, in English-illiterate countries, it is necessary to change the display for each of the countries. It is also likely that the descriptions cannot be seen in places with low visibility.

On the other hand, in the first embodiment, the display control unit 15 graphically displays the first display item corresponding to the first parameter concerning the operation state of the electric motor M and the second display item corresponding to the second parameter concerning the operation state of the electric motor M. Consequently, it is made possible to reduce the necessity for changing the display for each of the countries. It is made possible to visually/intuitively and easily check the operation state of the electric motor M irrespective of the places with low visibility.

Alternatively, in the case shown in FIGS. 14(*a*) and 14(*b*), only one display item, i.e., the rotation state is displayed about the operation state of the electric motor M. Therefore, it is difficult to compare, about a plurality of items, operation states of the electric motor, and thus, it is made difficult to multilaterally check, about a plurality of items, operation states of the electric motor.

On the other hand, in the first embodiment, the display control unit 15 graphically displays the first display item and the second display item in association with each other. Consequently, it is easy to, for example, compare, about a plurality of items, operation states of the electric motor, and thus it is made possible to multilaterally check, about a plurality of items, operation states of the electric motor.

In the first embodiment, the first parameter is, for example, a parameter concerning the rotating direction of the rotor M1 of the electric motor M and the second parameter is a parameter concerning the load state of the electric motor M. The display control unit 15 simultaneously displays, on one display screen 17*a* in the display unit 17, the first arrow indicating the rotating direction of the rotor M1 of the electric motor M and the second arrow indicating the load state of the electric motor M. Consequently, it is made possible to graphically display the first display item corresponding to the first parameter and the second display item corresponding to the second parameter in association with each other.

In the first embodiment, the display control unit 15 simultaneously displays the first arrow and the second arrow on one display screen 17*a* in the display unit 17 while changing at least one of thickness of the arrows, color of the arrows, lighting method for the arrows, and length of the arrows. Consequently, it is made possible to easily distinguish the first display item corresponding to the first parameter and the second display item corresponding to the second parameter from each other and visually recognize the first display item and the second display item.

Note that the display unit 17 and the operation unit 18 can be disposed close to each other on the housing 7a of the variable speed device 7. For example, the display unit 17 and the operation unit 18 can be collectively disposed as an operation panel on the housing 7a.

Alternatively, the display unit 17 and the operation unit 18 can be provided on the outside of the housing 7a as a separately-placed operation panel instead of being provided on the housing 7a of the variable speed device 7. In this case, the display unit 17 and the display control unit 15 can perform radio communication using an infrared ray, an electromagnetic wave, or the like. The operation unit 18 and the operation control unit 16 can perform radio communication using an infrared ray, an electromagnetic wave, or the like.

The display control unit 15 can display a rotating direction of a rotating direction command as a third display item corresponding to the third parameter. In this case, it is made possible to visually/intuitively and easily check whether the electric motor M is properly driven according to the rotating direction command of the variable speed device 7.

The display control unit 15 can indicate, for example, which of "accelerating", "in constant speed", "decelerating", and "stalling". For example, the display control unit 15 can indicate that the electric motor M is in the operation state of "accelerating" by repeatedly performing the display of the FIG. 4(a), FIG. 4(b), and FIG. 4(c) in this order. The display control unit 15 can indicate that the electric motor M is "stalling" by maintaining the display of FIG. 3(a). For example, the display control unit 15 can indicate that the electric motor M is in the operation state of "decelerating" by repeatedly performing the display of FIG. 4(c), FIG. 4(b), and FIG. 4(a) in this order. Alternatively, for example, the display control unit 15 can indicate that the electric motor M is in the operation state of "stalling" by maintaining the display of FIG. 4(a) (lighting).

The display control unit 15 can display, for example, the magnitude of speed as the operation state of the electric motor M. For example, the display control unit 15 can change, stepwise or continuously according to the magnitude of speed, the length of the arrow displayed in the forward rotating direction arrow indicator lamp 17a4a shown in FIG. 3(a). Alternatively, the display control unit 15 can further display a level gauge indicating the magnitude of speed beside the arrow displayed in the forward rotating direction arrow indicator lamp 17a4a shown in FIG. 3(a).

The display control unit 15 can indicate, for example, which of continuous load and instantaneous load the load state of the electric motor M is. For example, the display control unit 15 can light the load direction arrow indicator lamp 17a5a shown in FIG. 3(a) to indicate that the load state is the continuous load and cause the load direction arrow indicator lamp 17a5a shown in FIG. 3(a) to blink to indicate that the load state is the instantaneous load.

The display control unit 15 can display, for example, the magnitude of load as the load state of the electric motor M. For example, the display control unit 15 can change, stepwise or continuously according to the magnitude of load, the length of the arrow displayed in the load direction arrow indicator lamp 17a5a shown in FIG. 3(a). Alternatively, the display control unit 15 can further display a level gauge indicating the magnitude of load beside the arrow displayed in the load direction arrow indicator lamp 17a5a shown in FIG. 3(a).

Figure 5:
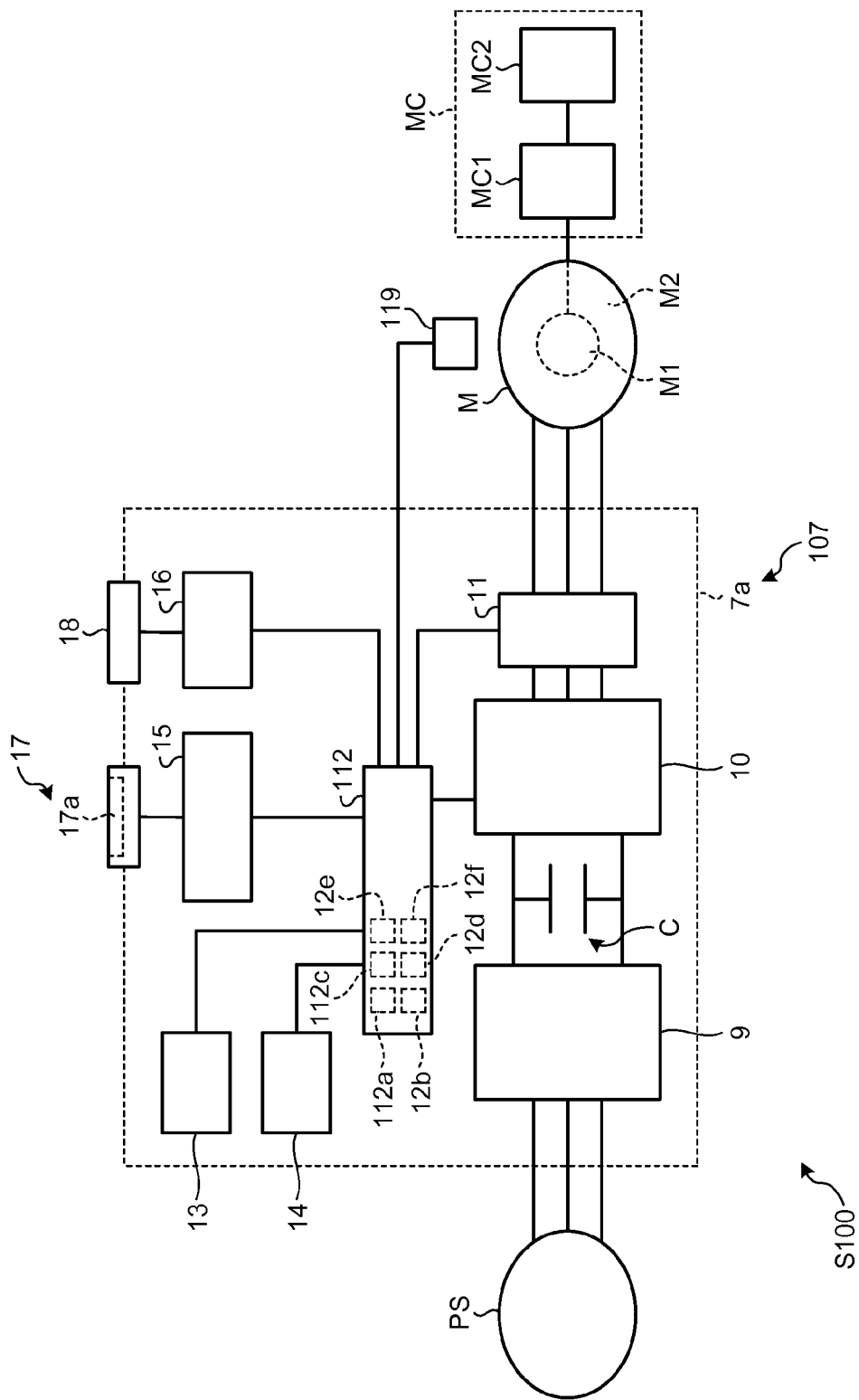
FIG. 5 is a diagram of the configuration of a variable speed system according to another modification of the first embodiment.
Figure 6:
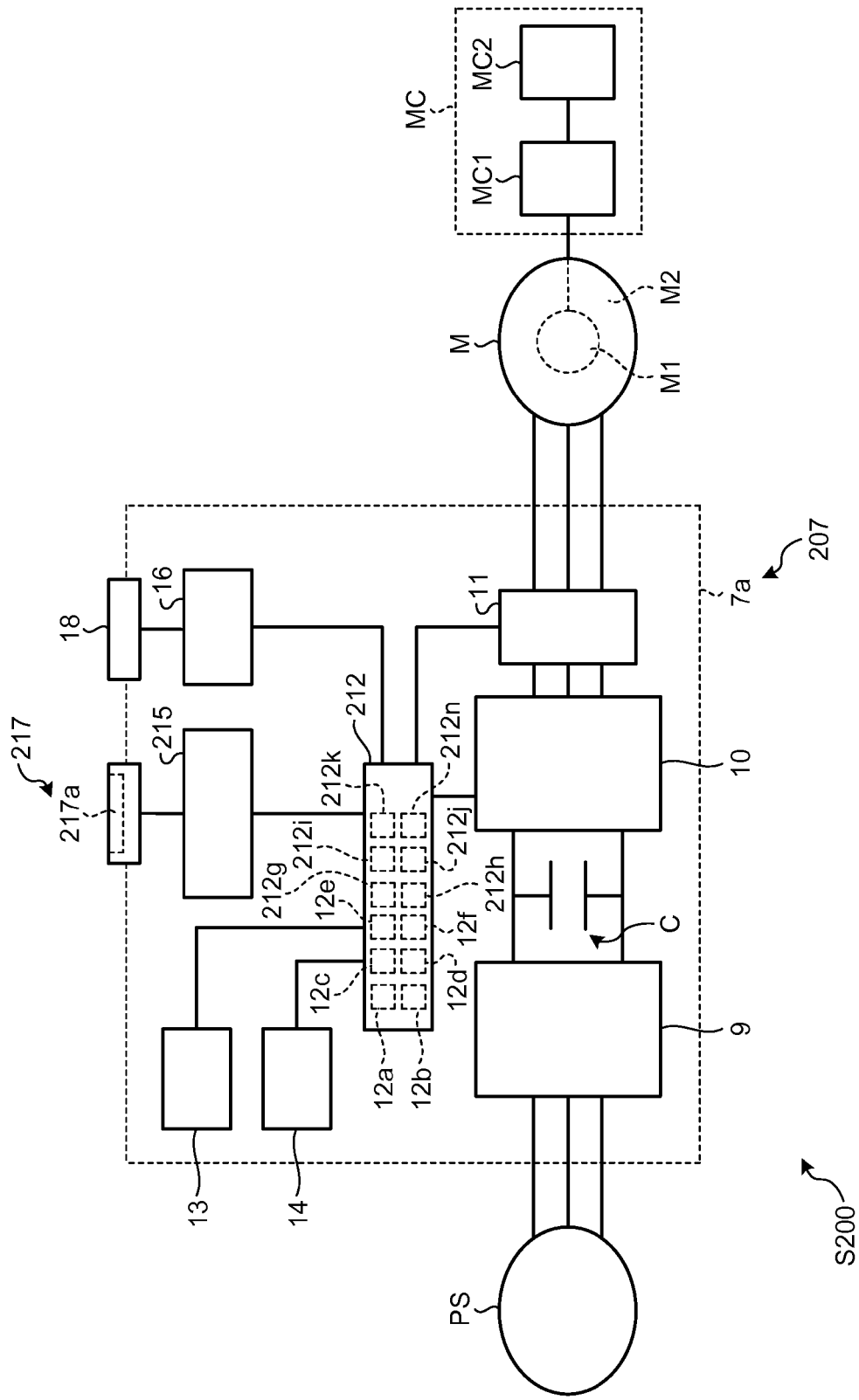
FIG. 6 is a diagram of the configuration of a variable speed system according to a second embodiment.

Alternatively, the variable speed system S100 can further include, as shown in FIG. 5, a position detector 119 that detects the rotating position of the rotor M1 of the electric motor M. In this case, a first calculating unit 112a of an inverter control unit 112 of a variable speed device 107 can receive a detection result of the rotating position from the position detector 119, apply predetermined calculation to the detection result of the rotating position, and calculate a rotating direction of the electric motor M. Further, a second calculating unit 112c can receive the detection result of the rotating position from the position detector 119, apply predetermined calculation to the detection result of the rotating position, and calculate rotating speed of the electric motor M.

Second Embodiment.

A variable speed system S200 according to a second embodiment is explained. In the following explanation, differences from the first embodiment are mainly explained.

In the first embodiment, the state of the mechanical apparatus MC caused to operate by the electric motor M is not particularly taken into account. However, in the second embodiment, the state of the mechanical apparatus MC caused to operate by the electric motor M can be grasped.

Specifically, an inverter control unit 212 of a variable speed device 207 of the variable speed system S200 further includes a fourth calculating unit 212g, a fourth acquiring unit 212h, a fifth calculating unit 212i, and a fifth acquiring unit 212j.

The fourth calculating unit 212g calculates a fourth parameter concerning an operation state of the mechanical apparatus MC. For example, after the driving of the electric motor M is started, the fourth calculating unit 212g receives the first parameter concerning the operation state of the electric motor M from the first calculating unit 12a. In the fourth calculating unit 212g, for example, a correlation between a rotating direction of the electric motor M and an operating direction of the mechanical apparatus MC is set in advance. The fourth calculating unit 212g calculates an operating direction of the mechanical apparatus MC by applying a rotating direction of the mechanical apparatus MC corresponding to the first parameter to the correlation. For example, when the electric motor M is a motor and the mechanical apparatus MC is an elevator, the fourth calculating unit 212g estimates that the mechanical apparatus MC is lifting a car, for example, when the electric motor M is rotating forward and estimates that the mechanical apparatus MC is lowering the car, for example, when the electric motor M is rotating backward. The fourth calculating unit 212g writes the calculated operation state of the mechanical apparatus MC in the random-access storage device 14 as the fourth parameter.

The fifth calculating unit 212i calculates a fifth parameter concerning the operation state of the mechanical apparatus MC. The fourth parameter and the fifth parameter are parameters associated with each other. For example, after the driving of the electric motor M is started, the fifth calculating unit 212i receives the second parameter concerning the operation state of the electric motor M from the second calculating unit 12c and receives the fourth parameter concerning the operation state of the mechanical apparatus MC from the fourth calculating unit 212g. In the fifth calculating unit 212i, for example, a correlation between a load state (a load direction) of the electric motor M and an operation state (a moving direction) of the mechanical apparatus MC is set in advance. The fifth calculating unit 212i calculates a load state of the mechanical apparatus MC by applying a load state (a load direction) of the mechanical apparatus MC corresponding to the second parameter and an operation state (a moving direction) of the mechanical apparatus MC corresponding to the fourth parameter to the correlation. For example, when the electric motor M is a motor and the mechanical apparatus MC is an elevator, the fifth calculating unit 212i estimates that force is applied in an opposite direction of an operating direction, for example, when the mechanical apparatus MC is lifting a car in a power running state of the electric motor M and estimates that force is applied in a direction same as the operating direction, for example, when the mechanical apparatus MC is lowering the car in a regeneration state of the electric motor M. The fifth calculating unit 212i writes the calculated operation state of the mechanical apparatus MC in the random-access storage device 14 as the fifth parameter.

A sixth calculating unit 212k calculates a sixth parameter concerning the operation state of the mechanical apparatus MC. The forth parameter, the fifth parameter, and the sixth parameter are parameters associated with one another. For example, after the driving of the electric motor M is started, the sixth calculating unit 212k receives, from the inverter control unit 212, a control signal supplied to the inverter unit 10, receives the second parameter concerning the operation state of the electric motor M from the second calculating unit 12c, and receives the fourth parameter concerning the operation state of the mechanical apparatus MC from the fourth calculating unit 212g. The sixth calculating unit 212k calculates presence or absence of abnormality occurrence of any one of the inverter unit 10 and the mechanical apparatus MC or both according to a control signal (a rotation command), a load state (a load direction) of the electric motor M, and an operation state (a moving direction) of the mechanical apparatus MC. For example, in the sixth calculating unit 212k, a correlation among the control signal (the rotation command) to the inverter unit 10, the load state (the load direction) of the electric motor M, and the operation state (the moving direction) of the mechanical apparatus MC is set in advance. The sixth calculating unit 212k estimates that abnormality has occurred in any one of the inverter unit 10 and the mechanical apparatus MC or both when the mechanical apparatus MC is not correctly moving in the direction estimated from the correlation between the control signal (the rotation command) and the load state (the load direction) of the mechanical apparatus MC corresponding to the second parameter and the operation state (the moving direction) of the mechanical apparatus MC corresponding to the fourth parameter. The sixth calculating unit 212k estimates that abnormality has not occurred in any one of the inverter unit 10 and the mechanical apparatus MC or both when a specified shift has not exceeded an allowable range. The sixth calculating unit 212k writes the calculated presence or absence of abnormality occurrence of any one of the inverter unit 10 and the mechanical apparatus MC or both in the random-access storage device 14 as the sixth parameter.

The fourth acquiring unit 212h acquires the fourth parameter. For example, after the driving of the electric motor M is started, the fourth acquiring unit 212h accesses the random-access storage device 14 and acquires the fourth parameter temporarily stored in the random-access storage device 14. The fourth acquiring unit 212h supplies the acquired fourth parameter to a display control unit 215.

The fifth acquiring unit 212j acquires the fifth parameter. For example, after the driving of the electric motor M is started, the fifth acquiring unit 212j accesses the random-access storage device 14 and acquires the fifth parameter temporarily stored in the random-access storage device 14. The fifth acquiring unit 212j supplies the acquired fifth parameter to the display control unit 215.

A sixth acquiring unit 212n acquires the sixth parameter. For example, after the driving of the electric motor M is started, the sixth acquiring unit 212n accesses the random-access storage device 14 and acquires the sixth parameter temporarily stored in the random-access storage device 14. The sixth acquiring unit 212n supplies the acquired sixth parameter to the display control unit 215.

According to the supply of the parameters, the display control unit 215 simultaneously displays, on one display screen 217a in a display unit 217, a fourth display item corresponding to the fourth parameter, a fifth display item corresponding to the fifth parameter, a sixth display item corresponding to the sixth parameter, and the third display item corresponding to the third parameter (see FIGS. 8(a) and 8(b)). The display control unit 215 graphically displays the fourth display item, the fifth display item, and the sixth display item in association with one another. For example, the display control unit 215 simultaneously displays, on the one display screen 217a in the display unit 217, an arrow indicating the operating direction of the mechanical apparatus MC (a third arrow) and an arrow indicating the load state of the mechanical apparatus MC (a fourth arrow) (see FIGS. 8(a) and 8(b)).

Figure 7:
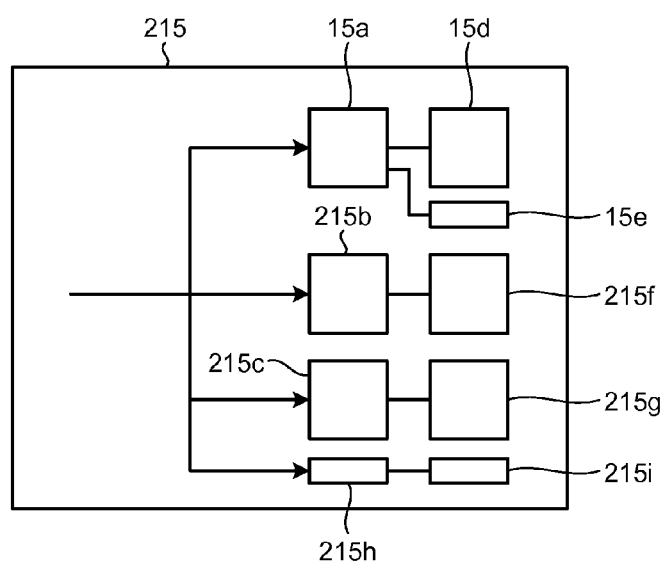
FIG. 7 is a diagram of the configuration of a display control unit in the second embodiment.

Specifically, the display control unit 215 includes, as shown in FIG. 7, a fourth display-item creating unit 215b, a fifth display-item creating unit 215c, a third figure display unit 215f, a fourth figure display unit 215g, a sixth display-item creating unit 215h, and a fifth figure display unit 215i instead of the first display-item creating unit 15b, the second display-item creating unit 15c, the first figure display unit 15f, and the second figure display unit 15g. FIG. 7 is a diagram of the configuration of the display control unit 215.

The fourth display-item creating unit 215b receives the fourth parameter from the fourth acquiring unit 212h. The fourth display-item creating unit 215b creates display data of the fourth display item corresponding to the fourth parameter. For example, the fourth display-item creating unit 215b creates display data of the fourth display item corresponding to the operating direction of the mechanical apparatus MC. The fourth display-item creating unit 215b supplies the created display data of the fourth display item to the third figure display unit 215f.

The fifth display-item creating unit 215c receives the fifth parameter from the fifth acquiring unit 212j. The fifth display-item creating unit 215c creates display data of the fifth display item corresponding to the fifth parameter. For example, the fifth display-item creating unit 215c creates display data of the fifth display item corresponding to the load state of the mechanical apparatus MC. The fifth display-item creating unit 215c supplies the created display data of the fifth display item to the fourth figure display unit 215g.

The sixth display-item creating unit 215h receives the sixth parameter from the sixth acquiring unit 212n. The sixth display-item creating unit 215h creates display data of the sixth display item corresponding to the sixth parameter. For example, the sixth display-item creating unit 215h creates display data of the sixth display item corresponding to the presence or absence of abnormality occurrence of any one of the inverter unit 10 and the mechanical apparatus MC or both. The sixth display-item creating unit 215h supplies the created display data of the sixth display item to the fifth figure display unit 215i.

The third figure display unit 215f receives the display data of the fourth display item from the fourth display-item creating unit 215b. The third figure display unit 215f generates, according to the display data of the fourth display item, display information for displaying the fourth display item. For example, when a portion where the fourth display item should be displayed in the display unit 217 is an operating-direction display section 217a6 (see FIG. 8(a)) that lights any one of an ascending direction arrow indicator lamp 217a6a and a descending direction arrow indicator lamp 217a6b, the third figure display unit 215f generates display information of the operating-direction display section 217a6 corresponding to an operating direction (an ascending direction or a descending direction) that should be displayed. The third figure display unit 215f supplies the display information to the operating-direction display section 217a6 to thereby cause the operating-direction display section 217a6 to display the operating direction corresponding to the display information on the display screen 217a. For example, in the case shown in FIG. 8(a), it is indicated in the operating-direction display section 217a6 on the display screen 217a that the operating direction of the mechanical apparatus MC (e.g., an elevator) is the ascending direction.

The fourth figure display unit 215g shown in FIG. 7 receives the display data of the fifth display item from the fifth display-item creating unit 215c. The fourth figure display unit 215g generates, according to the display data of the fifth display item, display information for displaying the fifth display item. For example, when a portion where the fifth display item should be displayed in the display unit 217 is a load-state display section 217a7 (see FIG. 8(a)) that lights any one of a load direction arrow indicator lamp 217a7a and a load direction arrow indicator lamp 217a7b, the fourth figure display unit 215g generates display information of the load-state display section 217a7 corresponding to a load state (the direction in which force is applied) that should be displayed. The fourth figure display unit 215g supplies the display information to the load-state display section 217a7 to thereby cause the load-state display section 217a7 to display the load state corresponding to the display information on the display screen 217a. For example, in the case shown in FIG. 8(a), it is indicated in the load-state display section 217a7 on the display screen 217a that the operating direction of the mechanical apparatus MC and the load direction of the mechanical apparatus MC are the same direction, that is, a load state of the mechanical apparatus MC is a state in which force is applied in the ascending direction. For example, in the case shown in FIG. 8(b), it is indicated in the load-state display section 217a7 on the display screen 217a that the operating direction of the mechanical apparatus MC and the load direction of the mechanical apparatus MC are opposite directions, that is, the load state of the mechanical apparatus MC is a state in which force is applied in the descending direction.

In this case, the arrow (the third arrow) displayed by the third figure display unit 215f and the arrow (the fourth arrow) displayed by the fourth figure display unit 215g are controlled so as to be changed in at least one of thickness of the arrows, color of the arrows, lighting method for the arrows, and length of the arrows. For example, in the case shown in FIGS. 8(a) and 8(b), an arrow of the operating-direction display section 217a6 and an arrow of the load-state display section 217a7 are displayed in different colors and displayed at different lengths. In FIGS. 8(a) and 8(b), the arrow of the operating-direction display section 217a6 is indicated by blackening and the arrow of the load-state display section 217a7 is indicated by hatching to indicate that both the arrows have colors different from each other.

The fifth figure display unit 215i receives the display data of the sixth display item from the sixth display-item creating unit 215h. The fifth figure display unit 215i generates, according to the display data of the sixth display item, display information for displaying the sixth display item. For example, when a portion where the sixth display item should be displayed in the display unit 217 is an abnormality-presence-or-absence display section 217a8 (see FIG. 8(a)) that lights or extinguishes an abnormality occurrence indicator lamp 217a8a or an abnormality occurrence indicator lamp 217a8b, the fifth figure display unit 215i generates display information of the abnormality-presence-or-absence display section 217a8 corresponding to abnormality presence or absence that should be displayed. The fifth figure display unit 215i supplies the display information to the abnormality-presence-or-absence display section 217a8 to thereby cause the abnormality-presence-or-absence display section 217a8 to display the abnormality presence or absence corresponding to the display information on the display screen 217a. For example, in the case shown in FIG. 8(a), because the abnormality occurrence indicator lamp 217a8a and the abnormality occurrence indicator lamp 217a8b are extinguished, it is indicated in the abnormality-presence-or-absence display section 217a8 on the display screen 217a that abnormality has not occurred in any one of the inverter unit 10 and the mechanical apparatus MC or both.

Note that, as the presence or absence of abnormality occurrence of any one of the inverter unit 10 and the mechanical apparatus MC or both, the third figure display unit 215f can light the operating direction indicator lamp 217a6a to indicate that abnormality has occurred (any one of the inverter unit 10 and the mechanical apparatus MC or both are stopped) and cause the operating direction indicator lamp 217a6a to blink to indicate that abnormality has not occurred (any one of the inverter unit 10 and the mechanical apparatus MC or both are operating). Alternatively, as the presence or absence of abnormality occurrence of any one of the inverter unit 10 and the mechanical apparatus MC or both, the third figure display unit 215f can light the abnormality occurrence indicator lamp 217a6a in, for example, blue to indicate that abnormality has not occurred (any one of the inverter unit 10 and the mechanical apparatus MC or both are operating) and light the abnormality occurrence indicator lamp 217a6a in, for example, red to indicate that abnormality has occurred (any one of the inverter unit 10 and the mechanical apparatus MC or both are stopped).

As explained above, in the second embodiment, the display control unit 215 simultaneously displays, on one display screen 217a in the display unit 217, the fourth display item corresponding to the fourth parameter concerning the operation state of the mechanical apparatus MC, the fifth display item corresponding to the fifth parameter concerning the operation state of the mechanical apparatus MC, the sixth display item corresponding to the sixth parameter concerning the operation state of the mechanical apparatus MC, and the third display item corresponding to the third parameter concerning the setting state of the electric motor M. Consequently, it is made possible to simultaneously check the operation state of the mechanical apparatus MC and the setting state of the electric motor M. Therefore, for example, it is easy to check whether the mechanical apparatus MC is properly operating according to the setting state of the electric motor M.

In the second embodiment, the display control unit 215 graphically displays the fourth display item, the fifth display item, and the sixth display item in association with one another. Consequently, it is possible to visually/intuitively grasp the operation state of the mechanical apparatus MC caused to operate by the electric motor M. It is made easy to adjust an operation state during abnormality and the variable speed device 207 during startup and during maintenance of the mechanical apparatus MC. Further, it is made unnecessary to use a display device other than the variable speed device 207. Therefore, it is made possible to reduce system costs.

In the second embodiment, the fourth parameter is the parameter concerning the operating direction of the mechanical apparatus MC, the fifth parameter is a parameter concerning the load state of the mechanical apparatus MC, and the sixth parameter is a parameter concerning the presence or absence of abnormality occurrence of any one of the inverter unit 10 and the mechanical apparatus MC or both. The display control unit 15 simultaneously displays, on one display screen 217a in the display unit 217, the third arrow indicating the operating direction of the mechanical apparatus MC, the fourth arrow indicating the load state of the mechanical apparatus MC, and a line segment indicating the presence or absence of abnormality occurrence of any one of the inverter unit 10 and the mechanical apparatus MC or both. Consequently, it is possible to graphically display the fourth display item corresponding to the fourth parameter, the fifth display item corresponding to the fifth parameter, and the sixth display item corresponding to the sixth parameter in association with one another.

In the second embodiment, the display control unit 15 simultaneously displays the third arrow and the fourth arrow on the one display screen 217a in the display unit 217 while changing at least one of thickness of the arrows, color of the arrows, lighting method for the arrows, and length of the arrows. Consequently, it is made possible to easily distinguish the fourth display item corresponding to the fourth parameter and the fifth display item corresponding to the fifth parameter from each other and visually recognize the fourth display item and the fifth display item.

Note that the mechanical apparatus MC can include, for example, a winding roll, an intermediate roll, and an unwinding roll. In this case, for example, a predetermined sheet unwound from the unwinding roll is wound by the winding roll through the intermediate roll. Therefore, the display control unit 215 can display, as the operation state of the mechanical apparatus MC, for example, any one of "unwinding roll in operation", "intermediate roll in operation", and "winding roll in operation". For example, the display control unit 215 can indicate that the mechanical apparatus MC is operating the unwinding roll by performing the display shown in FIG. 9(a), can indicate that the mechanical apparatus MC is operating the intermediate roll by performing the display shown in FIG. 9(b), or can indicate that the mechanical apparatus MC is operating the winding roll by performing the display shown in FIG. 9(c).

Figure 10:
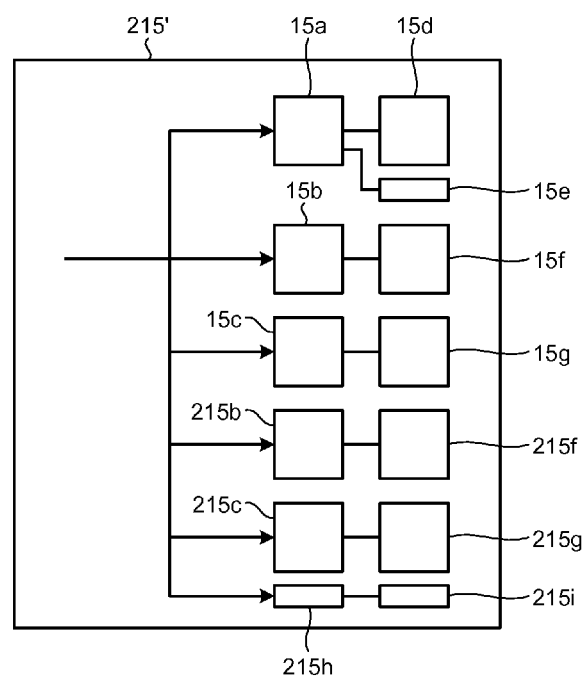
FIG. 10 is a diagram of the configuration of a display control unit in the modification of the second embodiment.
Figure 11:
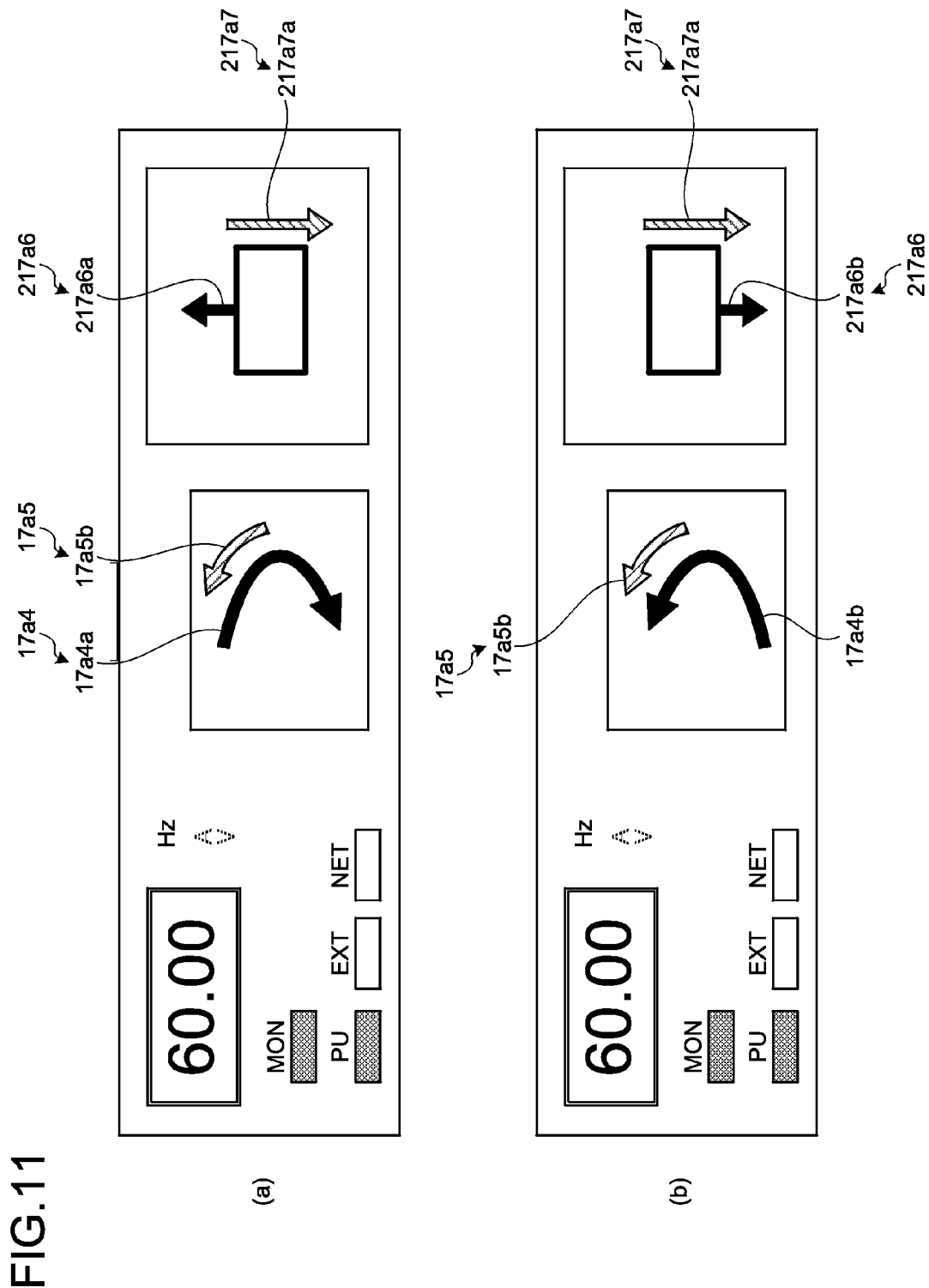
FIG. 11 is a diagram of the operation of a display screen in another modification of the second embodiment.

Alternatively a display control unit 215' can simultaneously display, on one display screen 217a in the display unit 217, the first display item corresponding to the first parameter concerning the operation state of the electric motor M and the second display item corresponding to the second parameter concerning the operation state of the electric motor M in addition to the fourth display item, the fifth display item, the sixth display item, and the third display item (see FIGS. 11(a) and 11(b)). In this case, the display control unit 215' further includes, for example, as shown in FIG. 10, the first display-item creating unit 15b, the second display-item creating unit 15c, the first figure display unit 15f, and the second figure display unit 15g in addition to the fourth display-item creating unit 215b, the fifth display-item creating unit 215c, the third figure display unit 215f, the fourth figure display unit 215g, the sixth display-item creating unit 215h, and the fifth figure display unit 215i. The operations of the first display-item creating unit 15b, the second display-item creating unit 15c, the first figure display unit 15f, and the second figure display unit 15g are respectively the same as the operations in the first embodiment.

For example, when the inverter control unit 212 determines that the rotating direction of the electric motor M is the forward rotating direction, as shown in FIG. 11(a), the forward rotating direction arrow indicator lamp 17a4a in the rotating-direction display section 17a4 is lit.

Further, for example, when the inverter control unit 212 determines that the operating direction of the mechanical apparatus MC is the ascending direction, as shown in FIG. 11(a), the ascending direction arrow indicator lamp 217a6a in the operating-direction display section 217a6 is lit. Consequently, an operator can visually recognize that the rotating direction of the electric motor M and the operating direction of the mechanical apparatus MC properly correspond to each other, that is, the mechanical apparatus MC is caused to properly operate by the electric motor M.

In this case, for example, when the inverter control unit 212 determines that the load state of the electric motor M is the power running state, as shown in FIG. 11(a), the forward rotating direction arrow indicator lamp 17a4a in the rotating-direction display section 17a4 and the load direction arrow indicator lamp 17a5b in the load-state display section 17a5 are lit. Consequently, the operator can visually recognize that the rotating direction of the electric motor M and the load direction of the electric motor M are opposite directions, that is, the load state of the electric motor M is the power running state.

Further, for example, when the inverter control unit 212 determines that the mechanical apparatus MC is in a state in which force is applied in the descending direction, as shown in FIG. 11(a), the ascending direction arrow indicator lamp 217a6a in the operating-direction display section 217a6 and the load direction arrow indicator lamp 217a7a in the load-state display section 217a7 are lit. Consequently, the operator can visually recognize that the load state of the electric motor M and the load state of the mechanical apparatus MC properly correspond to each other, that is, the mechanical apparatus MC is caused to properly operate by the electric motor M.

Alternatively, for example, when the inverter control unit 212 determines that the load state of the electric motor M is the regeneration state, as shown in FIG. 11(b), the backward rotating direction arrow indicator lamp 17a4b in the rotating-direction display section 17a4 and the load direction arrow indicator lamp 17a5b in the load-state display section 17a5 are lit. Consequently, the operator can visually recognize that the rotating direction of the electric motor M and the load direction of the electric motor M are the same direction, that is, the load state of the electric motor M is the regeneration state.

Further, for example, when the inverter control unit 212 determines that the mechanical apparatus MC is in a state in which force is applied in the descending direction, as shown in FIG. 11(b), the descending direction arrow indicator lamp 217a6b in the operating-direction display section 217a6 and the load direction arrow indicator lamp 217a7a in the load-state display section 217a7 are lit. Consequently, the operator can visually recognize that the load state of the electric motor M and the load state of the mechanical apparatus MC properly correspond to each other, that is, the mechanical apparatus MC is caused to properly operate by the electric motor M.

Figure 12:
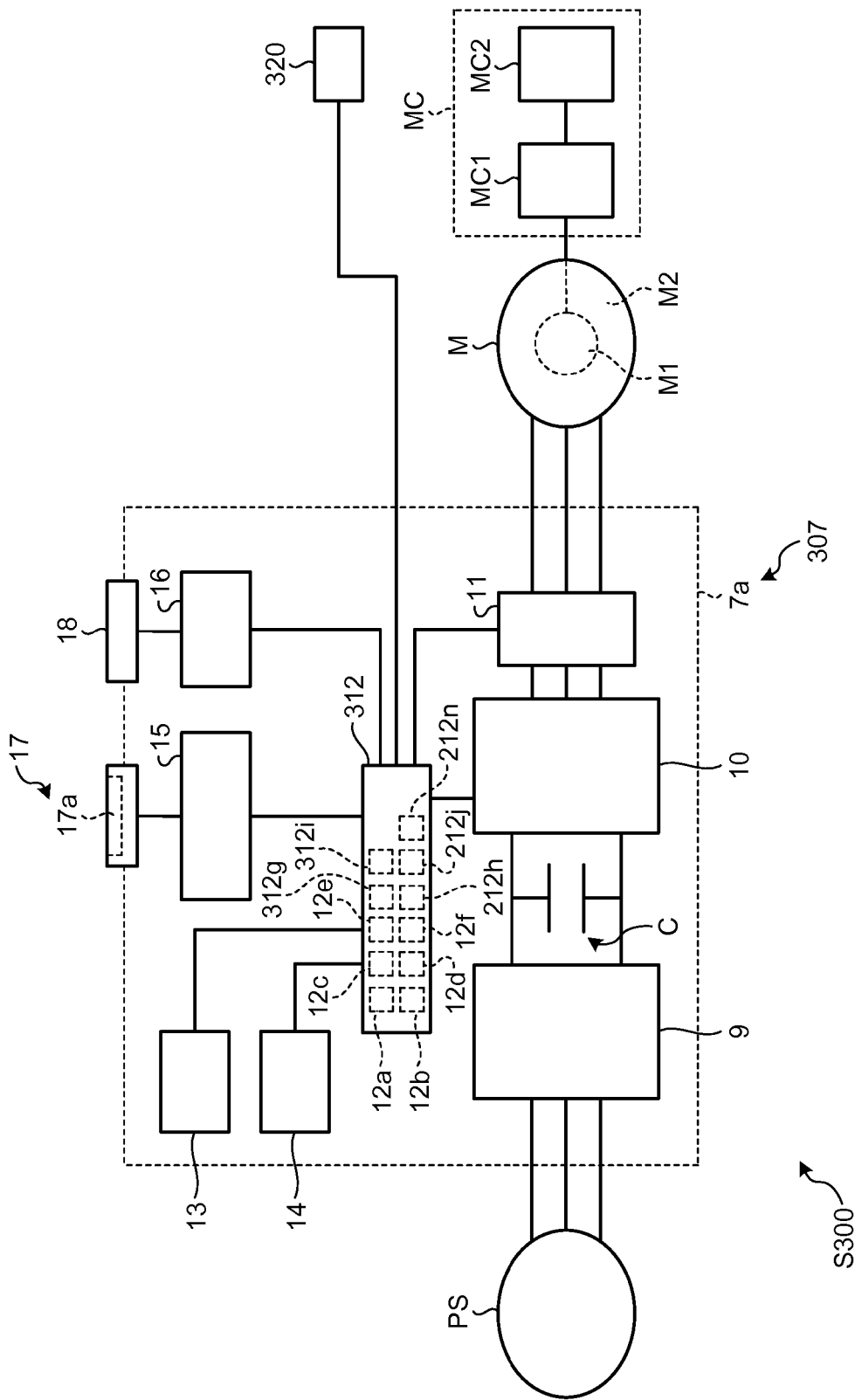
FIG. 12 is a diagram of the configuration of a variable speed system according to another modification of the second embodiment.

Alternatively, a variable speed system S300 can further include, as shown in FIG. 12, a position detector 320 that detects an operating position of the driven unit MC2. In this case, a fourth calculating unit 312g of an inverter control unit 312 of a variable speed device 307 can receive a detection result of the operating position from the position detector 320, apply a predetermined calculation to the detection result of the operating position, and calculate an actual operating direction of the mechanical apparatus MC. Further, a fifth calculating unit 312i can receive the detection result of the operating position from the position detector 320, apply a predetermined calculation to the detection result of the operating position, and calculate an actual moving position of the mechanical apparatus MC.

INDUSTRIAL APPLICABILITY

As explained above, the variable speed device according to the present invention is useful for driving the electric motor.

REFERENCE SIGNS LIST

7 Variable speed device
9 Converter unit
10 Inverter unit
11 Current detecting unit
12 Inverter control unit
12a First calculating unit
12b First acquiring unit
12c Second calculating unit
12d Second acquiring unit
12e Third calculating unit
12f Third acquiring unit
13 Read-only storage device
14 Random-access storage device
15 Display control unit
15a Third display-item creating unit
15b First display-item creating unit
15c Second display-item creating unit
15d Numerical-value display unit
15e Unit display unit
15f First figure display unit
15g Second figure display unit
16 Operation control unit
17 Display unit
17a Display screen
18 Operation unit
107 Variable speed device
112 Inverter control unit
112a First calculating unit
112c Second calculating unit
119 Position detector
207 Variable speed device
212 Inverter control unit
212g Fourth calculating unit
212h Fourth acquiring unit
212i Fifth calculating unit
212j Fifth acquiring unit
212k Sixth calculating unit
212n Sixth acquiring unit
215, 215' Display control units
215b Fourth display-item creating unit
215c Fifth display-item creating unit
215f Third figure display unit
215g Fourth figure display unit
215h Sixth display-item creating unit
215i Fifth figure display unit
217 Display unit
217a Display screen
307 Variable speed device
312 Inverter control unit
312g Fourth calculating unit
312i Fifth calculating unit
320 Position detector
817, 917 Display units
S, S100, S200, S300 Variable speed systems

The invention claimed is:

1. A variable speed device that drives an electric motor, the variable speed device comprising:
an inverter controller to calculate a first parameter regarding an operation state of the electric motor after driving of the electric motor is started,
calculate a second parameter regarding a load state of the electric motor after the driving of the electric motor is started,
and calculate a third parameter for an operation mode of the electric motor before the driving of the electric motor is started; and
a display controller to display, on one display screen, a first display item corresponding to the acquired first parameter, a second display item corresponding to the acquired second parameter, and a third display item corresponding to the acquired third parameter.

2. A variable speed device that drives an electric motor including a rotor, the variable speed device comprising:
a first acquirer to acquirer a first parameter regarding an operation start of the electric motor;
a second acquirer to acquire a second parameter regarding the operation state of the electric motor, the second parameter being related to the first parameter;
a third acquire to acquire a third parameter regarding a setting state of the electric motor; and
a display controller to simultaneously display, on one display screen, a first display item corresponding to the acquired first parameter, a second display item corresponding to the acquired second parameter, a third display item corresponding to the acquired third parameter, a first arrow indicating a rotating direction of the rotor, and a second arrow indicating the load state of the electric motor, wherein
the display controller graphically displays the first display item and the second display item in association with each other,
the acquired first parameter is a parameter regarding the rotating direction of the rotor, and
the acquired second parameter is a parameter regarding a load state of the electric motor.

3. The variable speed device according to claim 2, wherein the display controller simultaneously displays, on the display screen, the first arrow and the second arrow while changing at least one of thickness of the arrows, color of the arrows, lighting method for the arrows, and length of the arrows.

4. A variable speed system comprising:
a mechanical apparatus;
the electric motor that causes the mechanical apparatus to operate; and
the variable speed device according to claim 1 that drives the electric motor.

5. A variable speed system comprising:
a mechanical apparatus;
an electric motor that causes the mechanical apparatus to operate; and
a variable speed device that drives the electric motor, wherein the variable speed device includes:
- a fourth acquirer to acquire a fourth parameter regarding an operation state of the mechanical apparatus;
- a fifth acquire to acquire a fifth parameter regarding the operation state of the mechanical apparatus, the fifth parameter being related to the fourth parameter;
- a third acquire to acquire a third parameter regarding a setting state of the electric motor; and
- a display controller to simultaneously display, on one display screen, a fourth display item corresponding to the acquired fourth parameter, a fifth display item corresponding to the acquired fifth parameter, and a third display item corresponding to the acquired third parameter, and
- the display controller to graphically display the fourth display item and the fifth display item in association with each other.

6. The variable speed system according to claim 5, wherein
- the acquired fourth parameter is a parameter regarding an operating direction of the mechanical apparatus,
- the acquired fifth parameter is a parameter regarding a load state of the mechanical apparatus, and
- the display controller to simultaneously display, on the display screen, a third arrow indicating the operating direction of the mechanical apparatus and a fourth arrow indicating the load state of the mechanical apparatus.

7. The variable speed system according to claim 5, wherein the variable speed device further includes:
- a first acquirer to acquire a first parameter regarding an operation state of the electric motor; and
- a second acquirer to acquire a second parameter regarding the operation state of the electric motor, the second parameter being related to the first parameter,
- the display controller to simultaneously display, on the display screen, a first display item corresponding to the acquired first parameter, a second display item corresponding to the acquired second parameter, the fourth display item, the fifth display item, and the third display item, and
- the display controller graphically displays the first display item and the second display item in association with each other.

8. The variable speed system according to claim 7, wherein
- the electric motor includes a rotor,
- the acquired first parameter is a parameter regarding a rotating direction of the rotor,
- the acquired second parameter is a parameter regarding a load state of the electric motor,
- the acquired fourth parameter is a parameter regarding an operating direction of the mechanical apparatus,
- the acquired fifth parameter is a parameter regarding a load state of the mechanical apparatus, and
- the display controller simultaneously displays, on the display screen, a first arrow indicating the rotating direction of the rotor, a second arrow indicating the load state of the electric motor, a third arrow indicating the operating direction of the mechanical apparatus, and a fourth arrow indicating the load state of the mechanical apparatus.

* * * * *